(12) United States Patent
Oxford

(10) Patent No.: US 8,438,392 B2
(45) Date of Patent: May 7, 2013

(54) METHOD AND SYSTEM FOR CONTROL OF CODE EXECUTION ON A GENERAL PURPOSE COMPUTING DEVICE AND CONTROL OF CODE EXECUTION IN A RECURSIVE SECURITY PROTOCOL

(75) Inventor: William V. Oxford, Austin, TX (US)

(73) Assignee: Krimmeni Technologies, Inc., Austin, TX (US)

( * ) Notice: Subject to any disclaimer, the term of this patent is extended or adjusted under 35 U.S.C. 154(b) by 760 days.

(21) Appl. No.: 12/615,843

(22) Filed: Nov. 10, 2009

(65) Prior Publication Data

US 2010/0122088 A1 May 13, 2010

Related U.S. Application Data

(63) Continuation-in-part of application No. 12/251,669, filed on Oct. 15, 2008, now Pat. No. 7,747,876, which is a continuation of application No. 11/710,352, filed on Feb. 23, 2007, now Pat. No. 7,457,968, which is a continuation of application No. 10/465,274, filed on Jun. 19, 2003, now Pat. No. 7,203,844.

(60) Provisional application No. 61/113,111, filed on Nov. 20, 2008, provisional application No. 60/390,180, filed on Jun. 20, 2002.

(51) Int. Cl.
*H04L 9/00* (2006.01)

(52) U.S. Cl.
USPC .......................................... 713/169; 713/168

(58) Field of Classification Search ........................ None
See application file for complete search history.

(56) References Cited

U.S. PATENT DOCUMENTS

| | | | |
|---|---|---|---|
| 4,893,339 A | 1/1990 | Bright et al. | |
| 5,210,748 A | 5/1993 | Onishi et al. | |
| 5,210,870 A | 5/1993 | Baum et al. | |
| 5,285,497 A | 2/1994 | Thatcher | |
| 5,623,545 A | 4/1997 | Childs et al. | |

(Continued)

FOREIGN PATENT DOCUMENTS

| | | |
|---|---|---|
| GB | 2341955 | 3/2000 |
| JP | 2003101526 | 4/2003 |

(Continued)

OTHER PUBLICATIONS

Menezes (Alfred J. Menezes, Paul C. van Oorschot, Scott A. Vanstone, "Handbook of applied cryptography", Oct. 1996, ISBN: 0849385237), Chapter 9.*

(Continued)

*Primary Examiner* — Peter Poltorak
(74) *Attorney, Agent, or Firm* — Sprinkle IP Law Group

(57) ABSTRACT

Embodiments of systems and methods which provide highly specific control over the execution of general-purpose code block are disclosed. These embodiments may allow the exact circumstances under which a given code block is allowed to execute to be determined with specificity. Such a control mechanism may be coupled with embodiments of a data hiding system and method, based for example, on an ordered execution of a set of code segments implemented via recursive execution. When embodiments of these systems and methods are utilized together an unencumbered generality as well as a level of protection against attack that surpasses many other security systems may be obtained.

21 Claims, 16 Drawing Sheets

U.S. PATENT DOCUMENTS

| | | | |
|---|---|---|---|
| 5,764,774 | A | 6/1998 | Liu |
| 6,055,314 | A | 4/2000 | Spies et al. |
| 6,088,677 | A | 7/2000 | Spurgeon |
| 6,101,605 | A | 8/2000 | Buer |
| 6,226,742 | B1 | 5/2001 | Jakubowski et al. |
| 6,327,652 | B1 | 12/2001 | England et al. |
| 6,330,670 | B1 | 12/2001 | England et al. |
| 6,367,019 | B1 | 4/2002 | Ansell |
| 6,398,245 | B1 | 6/2002 | Gruse et al. |
| 6,412,070 | B1 | 6/2002 | An Dyke et al. |
| 7,185,369 | B2 | 2/2007 | Thoone et al. |
| 7,203,844 | B1 | 4/2007 | Oxford |
| 7,225,333 | B2 * | 5/2007 | Peinado et al. ............... 713/164 |
| 7,328,345 | B2 | 2/2008 | Morten et al. |
| 7,457,968 | B2 | 11/2008 | Oxford |
| 2002/0013772 | A1 | 1/2002 | Peinado |
| 2002/0138435 | A1 | 9/2002 | Williams et al. |
| 2004/0016002 | A1 | 1/2004 | Handelman et al. |
| 2005/0021941 | A1 | 1/2005 | Ohmori et al. |
| 2005/0058291 | A1 | 3/2005 | Candelore |
| 2006/0101524 | A1 | 5/2006 | Weber |
| 2008/0240420 | A1 | 10/2008 | Oxford |

FOREIGN PATENT DOCUMENTS

| | | |
|---|---|---|
| JP | 2003234728 | 8/2003 |
| JP | 2006222496 | 8/2006 |
| WO | WO2006080754 | 8/2006 |

OTHER PUBLICATIONS

Office Action for U.S. Appl. No. 12/788,516, mailed Aug. 10, 2011, 11 pgs.

Microsoft, Microsoft Computer Dictionary, Fifth Ed., ISBN 978-0-7356-1495-6, May 2002, p. 50.

Stallings, William, Cryptography and Network Security, 2d Ed. 1998, ISBN: 0138690170, pp. 237-263 and 271-314.

Office Action for U.S. Appl. No. 12/788,516, mailed Jan. 6, 2012, 11 pgs.

Lie et al., "Architectural Support for Copy and Tamper-Resistant Software", 9th Annual Conf. on Architectural Support for Programming Languages . . . , cambridge MA, 2000, 10 pgs.

Office Action mailed Aug. 23, 2007 for U.S. Appl. No. 11/710,352, 5 pgs.

International Search Report and Written Opinion mailed Sep. 26, 2008 for PCT/US2007/005803, 8 pgs.

International Preliminary Report on Patentability for PCT/US2007/005803, mailed Sep. 17, 2009, issued Sep. 8, 2009, 5 pgs.

Office Action mailed Sep. 25, 2009 for U.S. Appl. No. 12/251,669, 6 pgs.

International Search Report and Written Opinion for PCT/US2009/063861, completed Dec. 23, 2009, mailed Jan. 12, 2010, 8 pgs.

Extended EP Search Report issued for European Patent Application No. 07 772 246.0, mailed Jan. 19, 2012, 8 pages.

International Preliminary Report on Patentability (IPRP) as issued for PCT Application No. PCT/US2009/063861, mailed May 19, 2011, 8 pages.

Roger M. Needham and Michael D. Schroeder, "Using Encryption for Authentication in Large Networks of Computers," Communications of the ACM, vol. 21, No. 12, Dec. 1978, pp. 993-999.

Shimson Berkovits, "How to Broadcast a Secret", Advances in Cryptology: EUROCRYPT'91, Lecture notes in Computer Science, 1991, pp. 536-541.

Shafi Goldwasser and Silvio Micali, "Probabalistic Encryption," Journal of Computer and System Sciences, vol. 28, No. 2. Apr. 1984, pp. 270-299.

Office Action issued for Japanese Patent Application No. 2009-552649 mailed Jun. 20, 2012, 9 pages.

* cited by examiner

METHOD AND SYSTEM FOR CONTROL OF CODE EXECUTION ON A GENERAL PURPOSE COMPUTING DEVICE AND CONTROL OF CODE EXECUTION IN A RECURSIVE SECURITY PROTOCOL

RELATED APPLICATIONS

This application claims a benefit of priority under 35 U.S.C. §119 to U.S. Provisional Patent Application No. 61/113,111 entitled "Method and System for Control of Code Execution on a General Purpose Computing Device" by William V. Oxford filed Nov. 10, 2008. This application is a continuation in part of and claims a benefit of priority under 35 U.S.C. §120 to U.S. patent application Ser. No. 12/251,669, entitled "Method And System For A Recursive Security Protocol For Digital Copyright Control" by William V. Oxford filed Oct. 15, 2008, which has since issued as U.S. Pat. No. 7,747,876, on Jun. 29, 2010, which is a continuation of U.S. patent application Ser. No. 11/710,352, entitled "Method And System For A Recursive Security Protocol For Digital Copyright Control" by William V. Oxford filed Feb. 23, 2007, which has since issued as U.S. Pat. No. 7,457,968, on Nov. 25, 2008, which is a continuation of U.S. patent application Ser. No. 10/465,274, entitled "Method and System for a Recursive Security Protocol for Digital Copyright Control" by William V. Oxford filed Jun. 19, 2003, which has since issued as U.S. Pat. No. 7,203,844, on Apr. 10, 2007; which claims a benefit of priority under 35 U.S.C. §119 to U.S. Provisional Patent Application No. 60/390,180 entitled "A Recursive Security Protocol System and Method For Digital Copyright Control" by William V. Oxford filed Jun. 20, 2002. All applications cited within this paragraph are fully incorporated herein by reference.

TECHNICAL FIELD

This disclosure relates to a method for controlling arbitrary code execution on a general-purpose computer. Specifically, this disclosure relates to effective methods for linking the execution of code to a computing device to control the execution of the code. Even more particularly, this disclosure relates to controlling the execution of code in conjunction with the implementation of a recursive security protocol.

BACKGROUND

Computer viruses and other malicious software present a massive problem for the information technology industry. Since a general purpose computer can, by definition, run arbitrary code, it can be very difficult to maintain control over exactly which software is allowed to run, either in part or in whole, on a given general purpose computer platform and thus, it can be difficult to prevent the execution of malware or other types of undesirable software. There are a number of methods by which this level of control is currently attempted, but most efforts to isolate the processor from attack suffer from two fundamental problems: loss of generality in the processor platform or loss of performance. These losses stem from the basic issue of how to quickly and unequivocally distinguish between authorized and unauthorized usage modes.

A secondary, but related problem is that of copyright control. The vast majority of written, audio and visual works of art that are created today either begin or end up in digital format. One of the characteristics of digital data is that it can easily be substantially exactly duplicated. This property facilitates a wide variety of inexpensive distribution mechanisms, most of which are not easily controlled. The inherent inability to limit the distribution of digital content has had far-reaching implications on the field of copyright law over the last couple of decades. While certain systems and methods have been developed to control the copying and distribution of such duplicated data, one problem with these systems and methods is that they may be circumvented through the execution of certain types of software in conjunction with these systems and methods, for example, code which modifies the systems and methods, or obtains data utilized by such systems and methods.

Thus, there is a need to find systems and methods by which some amount of control over the execution of code on a general purpose computing device may be asserted, where by utilizing such systems and methods in conjunction with a security protocol the effectiveness of such a system may be enhanced.

SUMMARY

Embodiments of systems and methods which provide highly specific control over the execution of general-purpose code block are disclosed. These embodiments may allow the exact circumstances under which a given code block is allowed to execute to be determined with specificity. Such a control mechanism may be coupled with embodiments of a data hiding system and method, based for example, on an ordered execution of a set of code segments implemented via recursive execution. When embodiments of these systems and methods are utilized together an unencumbered generality as well as a level of protection against attack that surpasses many other security systems may be obtained.

In particular, in one embodiment, systems and methods for conditional control over code execution are disclosed along with systems and methods for obscuring data that is used in a particular computation, while nonetheless still allowing the use of that data. These systems and methods for control or obfuscation can be used in a large number of potential application areas, including the areas of security which may encompass, but are not limited to, the following: digital security, copyright control, conditional access, protection against undesirable computer viruses, etc. Specifically, embodiments may be utilized in conjunction with a recursive security protocol to augment such a security protocol.

Additionally, embodiments of systems are presented which embody these types of methodologies in computer systems, hardware, and software. It should be noted that the exact same hardware implementation could potentially be used to implement any one or combination of the entire range of solutions, depending on the requirements of the software.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DETAILED DESCRIPTION

Figure 1:
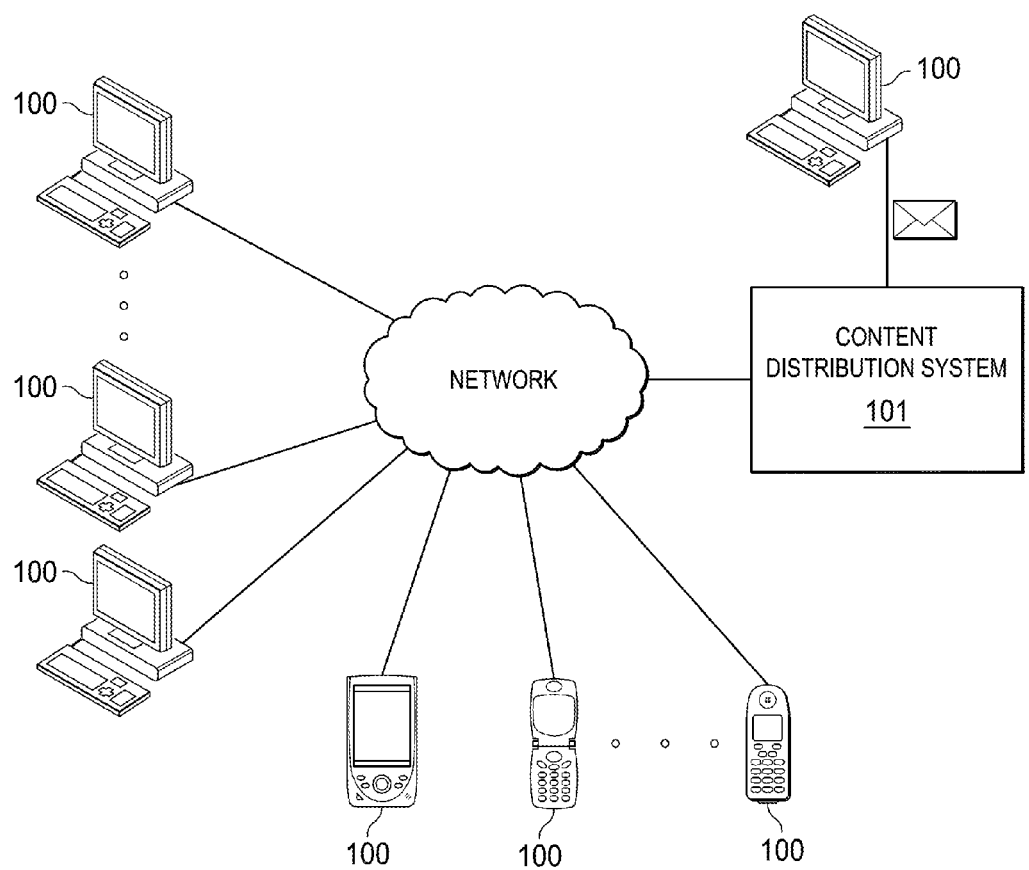
FIG. 1 depicts one embodiment of an architecture for content distribution.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments are described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.", "in one embodiment."

As discussed above, it is desired to allow a processor to execute an arbitrary segment of code in a prescribed manner. This problem of control is compounded by the many varied methods by which even legitimate software can be manipulated to produce unintended or even malicious results. These methods of attack may include exploiting poorly written, but otherwise valid code by feeding bogus arguments as input to the routine in order to exploit input data corner cases or even other algorithmic deficiencies. Other possible avenues of attack include independently modifying the data that are stored in various processor registers (such as the stack pointer) or external memory locations that are referenced by otherwise legitimate code in a manner to produce improper or intentionally erroneous results.

There are a number of mechanisms by which this kind of control can be affected. These systems include both simple as well as complex schemes that attempt to protect the processor from this kind of unintended usage. One reasonably secure, but complex mechanism includes pre-encryption of a code segment prior to its execution. Once the code segment is loaded into the processor from memory, it must be decrypted under carefully controlled circumstances and then executed in a secure fashion (in other words, it must not be modified or tampered with between the decryption operation and the subsequent execution). This mechanism suffers from a performance inefficiency that can be incurred because the processor must wait until the code segment in question is decrypted prior to being able to begin execution. This latency between the selection of a particular code segment to be executed and the actual post-decryption execution can cause many problems including, but not limited to, processor pipeline stalls and data path inefficiencies as well as providing another avenue for potential attacks (by somehow hijacking the code in between the decryption and the execution operations).

This encrypted code mechanism also does nothing to protect the processor from the eventuality of a hacker who manages to properly decrypt (or who obtains a decrypted copy of) the ostensibly protected encrypted code segment. In that case, they could then run that unprotected code in a non-controlled manner, either on the target processor or on some other non-authorized processor. Thus, it is preferable to find a way to exercise control over exactly which code segments can be run on a particular processor or processors, irrespective of whether the code is distributed in the clear (i.e., in plaintext form) or in encrypted form. On the other hand, if the code that can be run on a particular processor is limited to some pre-selected subset, then the general-purpose nature of the processor itself may be violated. This could possibly have the effect of constraining the architecture in such a way that the processor becomes less general purpose and thus, much less flexible in its potential application space. There will always be a strong desire for maximally flexible general-purpose processor architectures, but it is exactly those processors that are most vulnerable to malware attacks.

Thus, there is a need for a method for control of code execution that is general-purpose enough to not depend on any particular processor architecture. It would also be useful if such a method would also not adversely impact either the object code density or the execution pipeline of the target processor. At the same time, is desirable that such systems and methods provide protection against unlicensed use of otherwise legitimate code segments on either an original target processor or some other non-intended target processor. Such a method would be a valuable tool in the battle for control over software viruses and malware as well as a uniquely powerful mechanism for protecting copyright in a world of digital content.

To that end, attention is now directed to embodiments of systems and methods which provide highly specific control over the execution of general-purpose code block, in turn, allowing a programmer to determine the exact circumstances under which a given code block is allowed to execute. These conditions may include (but are not limited to) such constraints as the individual device on which the code block is attempting to execute, the environment in which the code block is called, the time of execution, the order of execution as well as the number of times the code block has been called in a particular execution thread.

Such a control mechanism may be coupled with embodiments of a data hiding system and method, based for example, on an explicitly ordered execution of a set of called code segments implemented in one embodiment via recursive execution. When embodiments of these systems and methods are utilized together an unencumbered generality as well as a level of protection against attack that surpasses many other security systems may be obtained.

Before discussing embodiments in more detail it may helpful to give a general overview of an architecture in which embodiments of the present invention may be effectively utilized. FIG. 1 depicts one embodiment of such a topology. Here, a content distribution system 101 may operate to distribute digital content (which may be for example, a bit stream comprising audio or video data, a software application, etc.) to one or more target units 100 (also referred to herein as endpoint devices) which comprise protocol engines. These target units may be part of, for example, computing devices on a wireline or wireless network or a computer device which is not networked, such computing devices including, for example, a personal computers, cellular phones, personal data assistants, media players which may play content delivered as a bitstream over a network or on a computer readable storage media that may be delivered, for example, through the mail, etc. As will be described later this digital content may compose or be distributed in such a manner such that control over the execution of the digital content may be controlled and security implemented with respect to the digital content.

Figure 2:
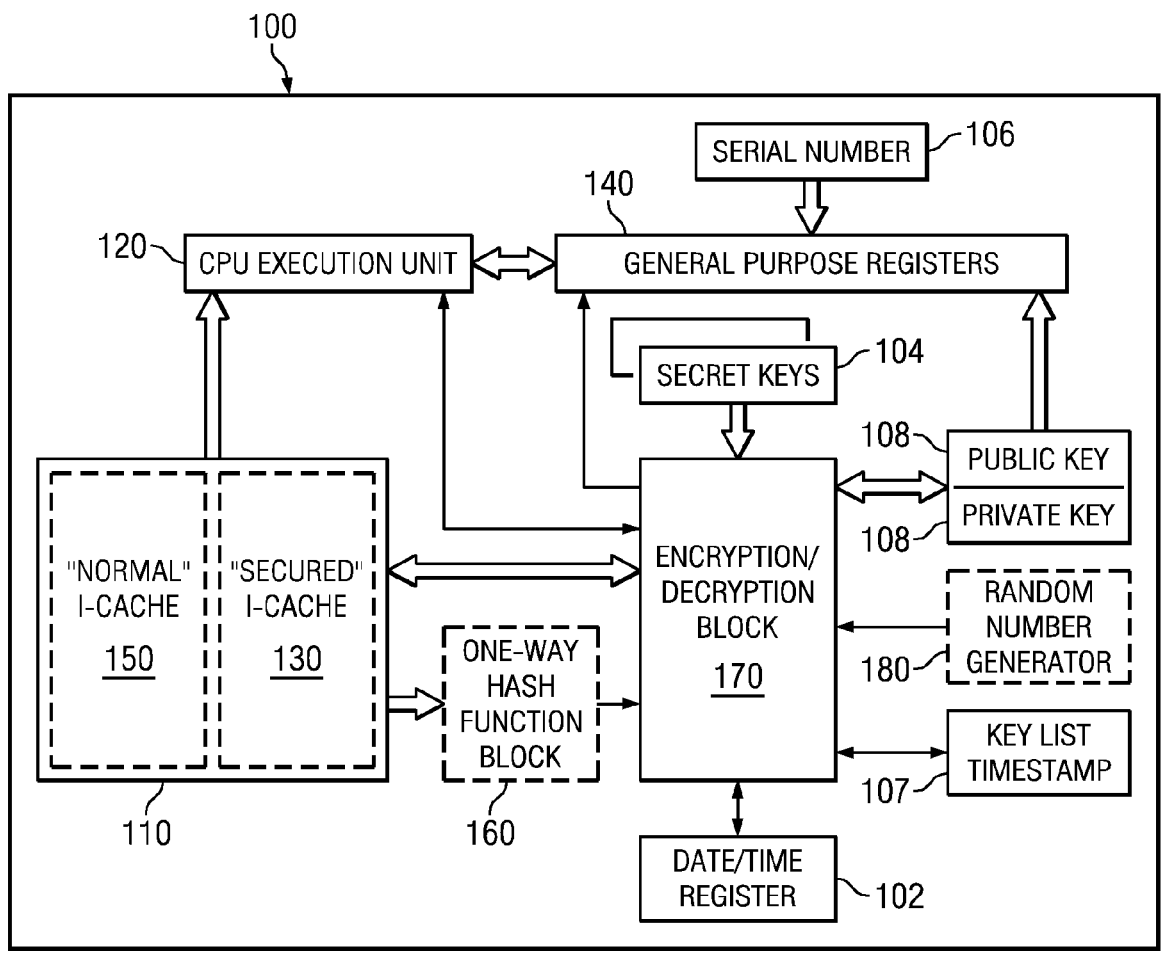
FIG. 2 depicts one embodiment of a target unit general purpose computing device.

FIG. 2 depicts an architecture of one embodiment of a target unit that is capable of controlling the execution of the digital content or implementing security protocols in conjunction with received digital content. Elements of the target unit may include a set of blocks, which implement the protocol in a secure manner on a protocol engine of the target unit 100. It will be noted that while these blocks are described as hardware in this embodiment, software may be utilized to accomplish similar functionality with equal efficacy. It will also be noted that while certain embodiments may include all the blocks described herein other embodiments may utilize lesser or additional blocks.

The first of these blocks is a real-time clock or date/time register 102. This is a free-running timer that is capable of being set or reset by a secure interaction with a central server. Since the time may be established by conducting a query of a secure time standard, it may be more convenient to have this function be on-chip. Target unit 100 may also comprise random number generator 180 which may be configured to produce a sequence of sufficiently random numbers or which can then be used to supply seed values for a pseudo-random number generation system. This pseudo-random number generator can also potentially be implemented in hardware, software or in "secure" software.

One-Way Hash Function block 160 may be operable for implementing a hashing function substantially in hardware. Another portion of the target unit 100 may be a hardware-assisted encryption/decryption system 170, which uses the target unit's 100 secret keys or public/private keys (described later) to operate on encrypted messages in order to translate them into executable code blocks or on unencrypted data to transform it into an encrypted message. This decryption system 170 can be implemented in a number of ways. It should also be noted that this combination of a One-Way Hash Function and a subsequent encryption/decryption system may comprise a digital signature generator that can be used for the validation of any digital data, whether that data is distributed in encrypted or in plaintext form. The speed and the security of the entire protocol may vary depending on the construction of this block, so it may be configure to be both flexible enough to accommodate security system updates as well as fast enough to allow the system to perform real-time decryption of time-critical messages.

Keeping this in mind, it is not material to embodiments of a protocol exactly which encryption algorithm is used for this hardware block 170. In order to promote the maximum flexibility, it is assumed that the actual hardware is general-purpose enough to be used in a non-algorithmically specific manner, but there are many different means by which this mechanism can be implemented. It should be noted at this point that the terms encryption and decryption will be utilized interchangeably herein when referring to engines (algorithms, hardware, software, etc.) for performing encryption/decryption. As will be realized if symmetric encryption is used in certain embodiments, the same or similar encryption or decryption engine may be utilized for both encryption and decryption.

Another block is memory 110 where code that is to be executed can be stored. This is typically known as an Instruction Cache (I-Cache). In some embodiments, an important characteristic of portions of this I-Cache 110 is that the data contained within certain blocks be readable only by CPU execution unit 120. In other words, this particular block of I-Cache memory 130 is execute-only and may not be read from, nor written to, by any software. This block of I-Cache will also be referred to as the "secured I-Cache" 130 herein. The manner by which code to be executed is stored in this secured I-Cache block 130 may be by way of another block which may or may not be depicted. Normal I-Cache 150 may be utilized to store code that is to be executed normally as is known in the art.

Additionally, in some embodiments, certain blocks may be used to accelerate the operation of a secure code block. Accordingly, a set of CPU registers 140 may be designated to only be accessible while the CPU 120 is executing secure code or which are cleared upon completion of execution of the secure code block (instructions in the secured code block 130 referred to as secure mode), or if, for some reason the a jump to any section of code which is located in the non-secure or "normal" I-Cache or other area occurs during the execution of code stored in the secured I-Cache 130.

In one embodiment, CPU execution unit 120 may be configured to track which registers 140 are read from or written to while executing the code stored in secured code block 130 and then automatically clear these registers upon exiting the "secured execution" mode. This allows the secured code to quickly "clean-up" after itself such that only data that is permitted to be shared between two kinds of code blocks is kept intact. Another possibility is that an author of code to be executed in the secured code block 130 can explicitly identify which registers 140 are to be cleared.

Another potential manner for dealing with the "leaking" of data stored in registers 140 between secure and non-secure code segments is to identify a set of registers 140 which are to be used only when the CPU 120 is executing secured code. In one embodiment this may be accomplished utilizing a version of the register renaming and scoreboarding mechanism, which is practiced in many contemporary CPU designs. If the execution of a secured code block is treated as an atomic action (i.e., it is non-interruptible) may make this renaming and scoreboarding easier to implement.

Even though there may seem to be little possibility of the CPU 120 executing a mixture of "secured" code (code in the secured code block 130) and "unsecured code" (code in another location such as normal I-cache 150 or another location in memory), such a situation may arise in the process of switching contexts such as when jumping into interrupt routines, or depending on where the CPU 120 context is stored (most CPU's store the context in main memory, where it is potentially subject to discovery and manipulation by an unsecured code block).

In order to help protect against this eventuality, in one embodiment another method which may be utilized for protecting the results obtained during the execution of a secured code block that is interrupted mid-execution from being exposed to other execution threads within a system is to disable stack pushes while a processor is operating in secured execution mode. This disabling of stack pushes will mean that a secured code block is thus not interruptable in the sense that, if the secured code block is interrupted prior to its normal completion, it cannot be resumed and therefore must be restarted from the beginning. It should be noted that in certain embodiments if the "secured execution" mode is disabled during a processor interrupt, then the secured code block may also potentially not be able to be restarted unless the entire calling chain is restarted.

Each target unit 100 may also have two sets of secret key constants 104; the values of neither of which are software-readable. The first of these keys (the primary secret key) may be organized as a set of secret keys, of which only one is readable at any particular time. If the "ownership" of a unit is changed (for example, the equipment containing the protocol engine is sold or its ownership is otherwise transferred), then the currently active primary secret key may be "cleared" or overwritten by a different value. This value can either be transferred to the unit in a secure manner or it can be already stored in the unit in such a manner that it is only used when this first key is cleared. In effect, this is equivalent to issuing a new primary secret key to that particular unit when its ownership is changed or if there is some other reason for such a change (such as a compromised key). A secondary secret key may be utilized with the target unit 100 itself. Since the CPU 120 of the target unit 100 cannot ever access the values of either the primary or the secondary secret keys, in some sense, the target unit 100 does not even "know" its own secret keys 104. These keys are only stored and used within the security block of the target unit's CPU 120.

Yet another set of keys may operate as part of a temporary public/private key system (also known as an asymmetric key system or a PKI system). The keys in this pair are generated on the fly and may be used for establishing a secure communications link between similar units, without the intervention of a central server. As the security of such a system is typically lower than that of an equivalent key length symmetric key encryption system, these keys may be larger in size than those of the set of secret keys mentioned above. These keys may be used in conjunction with the value that is present in the on-chip timer block in order to guard against "replay attacks", among other things. Since these keys are generated on the fly, the manner by which they are generated may be dependent on the random number generation system 180.

In one embodiment, one method that can be used to affect a change in "ownership" of a particular target unit is to always use the primary secret key as a compound key in conjunction with another key 107, which we will refer to as a timestamp or timestamp value, as the value of this key may be changed (in other words may have different values at different times), and may not necessarily reflect the current time of day. This timestamp value itself may or may not be itself architecturally visible (i.e., it may not necessarily be a secret key), but nonetheless it will not be able to be modified unless the target unit is operating in secured execution mode. In such a case, the consistent use of the timestamp value as a component of a compound key whenever the primary secret is used can produce essentially the same effect as if the primary secret key had been switched to a separate value, thus effectively allowing a "change of ownership" of a particular target endpoint unit without having to modify the primary secret key itself.

Figure 15:
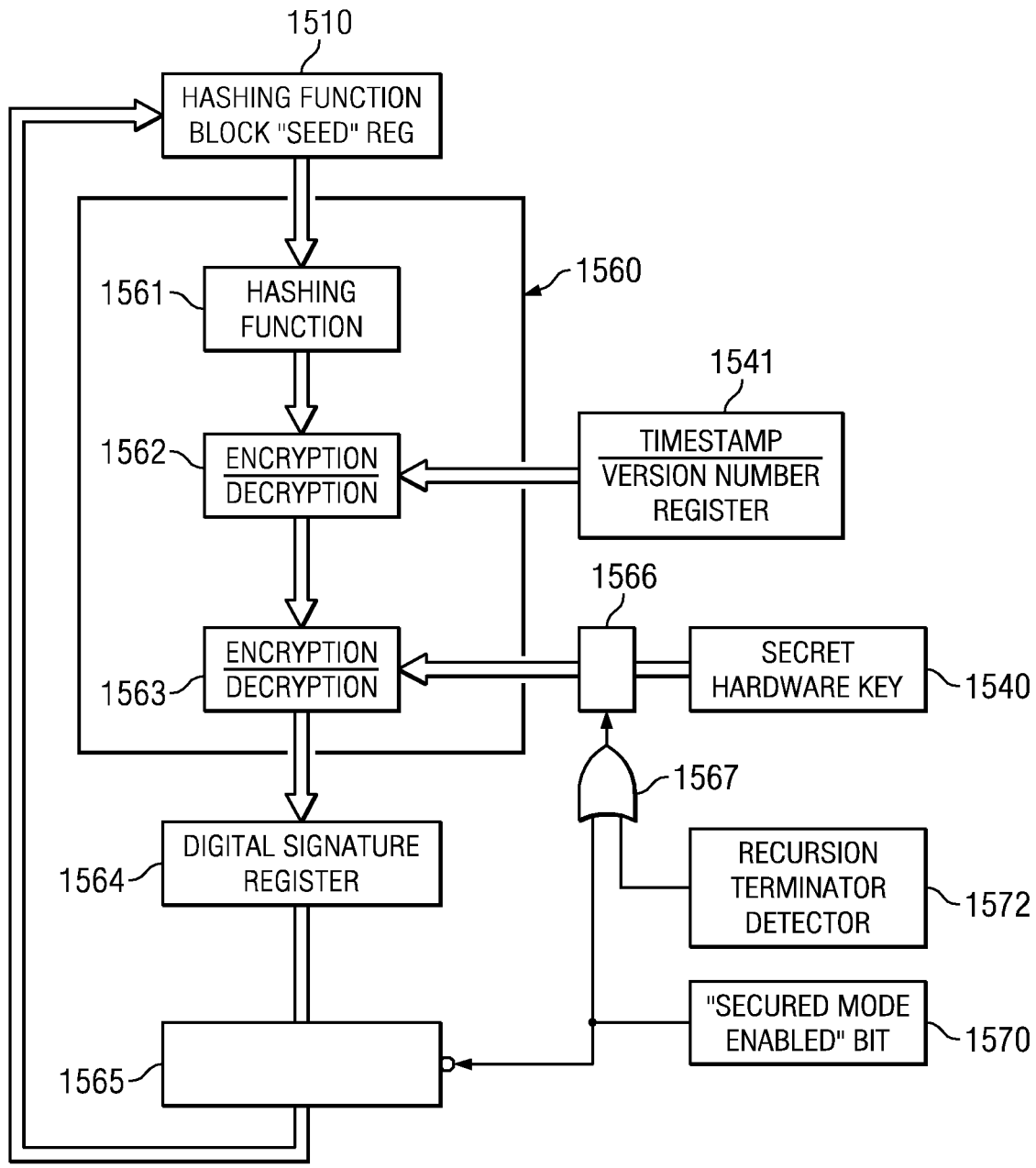
FIG. 15 depicts one embodiment of a digital signature function block.

It may now be useful to go into more detail regarding the one-way hash function hardware of a target unit. Referring now to FIG. 15, one embodiment of a one-way hash function block that can use the result of a digital signature operation generated in one iteration of a recursive security protocol as a seed value for the one-way hash function in a subsequent iteration is depicted. In one embodiment, the state of the target unit as far as it pertains to whether it is operating in secured execution mode or not can be reflected by the value of a hardware bit 1570 that will be referred to herein as the "Secured Mode Enabled" bit.

Here, the default state of this hardware bit may be cleared (i.e., the default state of the target processor is not to be operating in secured execution mode). The interaction of this bit with the One-Way hash function hardware block 1561 in certain embodiments may be described in two parts. In the first (non-secured) case, all accesses to the Secret Hardware key 1540 are blocked, since the "Secured Mode Enabled" bit acts as a gatekeeper to only allow use of the Secret Hardware key when this hardware bit is set (for example to a "1", however it will also be noted that in certain architectures the bit may be considered "set" when it has a value of "0"). Also in this case, the output of the Digital Signature Register 1564 is fed back to form the input "Seed" 1510 of the One-Way Hash function 1561. Thus, while the processor is operating in this "non-secured execution" mode, the intermediate results of any of the one-way Hash function operations are fed back to form the seed for any subsequent one-way hash function operations. This allows a running checksum equivalent of the entire calling chain of a set of nested or concatenated functions to be kept. In the case where each code block that is attempted to be executed is first evaluated with this one-way hash function prior to it being allowed to execute it the entire calling chain of any given code block can be substantially unambiguously determined with this single mechanism.

Likewise, in the case where the "Secured Mode Enabled" bit is set (i.e., where the processor is operating in "Secured Execution mode"), the Secret Hardware Key is accessible (in other words, directly accessible or at least its value is able to be used in a calculation operation, even if its value is not directly accessible by the processor itself). Additionally, when operating in Secured Execution Mode the output of the Digital Signature Register is not fed back to form the seed value for subsequent evaluations of the one-way hash function. The exact implementation of this Digital Signature generator block will be discussed in more detail at a later point. As can be seen then, in certain embodiments the entire calling chain of a particular code block can be validated prior to its secure execution without the need to utilize measures such as system-wide software or hardware validation (or attestation) operations. Note that, as in the case described earlier for the Timestamp Register, in certain embodiments this "Secured Mode Enabled" bit may or may not be architecturally visible to the processor, but its state may not be explicitly set by the processor. This hardware bit could be reset to a default value by calling a non-secured code segment, but in one embodiment, the only manner in which this bit can be set is through direct action on the part of the hardware. In the case where the bit is architecturally visible, it can be explicitly determined whether or not the processor is operating in secured execution mode. In the case where it is not architecturally visible, then the determination can nonetheless be made implicitly by evaluating some expression whose value somehow depends on the hardware secret key.

It may now be useful to describe basic problems underlying subjects that may be germane to the control of code execution and the implementation of security protocols in more detail. Then it can be shown how to implement control over the execution of arbitrary-code on an arbitrary general purpose processor using embodiments of the hardware described above and how embodiments of these systems and methods may be effectively utilized with security protocols and system to construct an effective overall security system.

Secret Key Hiding

The majority of commercial digital content delivery systems include some form of encryption or data hiding to try to protect the digital media data from being duplicated and distributed freely. In the vast majority of cases, the data hiding strategy is eventually proven to be a completely ineffective means of content protection. One of the main reasons that this hiding has proven unsuccessful is that the exact data that is to be protected from exposure must nonetheless be freely available for use by any authorized party. Thus, a set of seemingly contradictory requirements exists for the distribution of digital content.

In the case where the original digital content can be separately encrypted for all intended recipients and where only the intended recipient may actually make use of the distributed digital content then the security of the system can potentially be quite good. However, unless a number of specific conditions are met, the security of this kind of system can be shown to be deficient in several respects. First, such a system is less efficient in that it requires that the entire distributed data set must be re-encrypted separately for each intended recipient. Second, the distributor may need to ensure that no unauthorized decryption is possible on a general-purpose processor. Third, each individual receiving device must be unique in the sense that it must possess some attribute that cannot be easily duplicated on some other endpoint device (or emulated on a general-purpose processor). If either of these last two conditions is violated, then this system is vulnerable to attack simply by intercepting both the individually encrypted data as well as the device-specific key that is associated with that data.

In fact, it can be shown that the security of such a system may be based on the security of the unique attribute of each of the receiving devices. This unique attribute is typically implemented using a secret key that is known only to the distributor and the authorized recipient. While, in principle, this kind of setup can be an effective security system, the requirement that the original digital content be separately encrypted for each recipient makes the actual implementation impractical for most purposes. If it is desired that the original digital content be encrypted once and identically distributed to all potentially authorized parties, the problem then reverts back to that of data hiding. These types of problems are known as the field of Broadcast Encryption.

One of the fundamental problems with a distributed secret data system of almost any kind is that, in the majority of cases, all of the messages and data that flow back and forth between the separate entities of the security system are usually transmitted in the open and are thus observable by eavesdroppers. Thus, any messages or data that are transmitted between the individual components of such a system should be encrypted to protect against interception by unauthorized parties. Another problem that must be addressed in such a system is the verification of the identity of both the transmitter as well as the receiver in any such secret data transmission. In the case where the two parties are not known to each other, a mutually trusted intermediary strategy is typically employed.

Additionally, however, once the secret data has arrived at its destination, an equally difficult problem that must be addressed is how to securely use that secret data in such a manner that it is not compromised. This precaution is usually necessary as it is also possible that even a legitimate endpoint may have its security compromised by providing it with false information. So, in addition to protecting against unauthorized discovery during distribution it is sometimes desired to protect the secret data from discovery by an otherwise authorized user of that secret data.

In one embodiment, such desired control may be implemented, using a simple time-dependent use of an architecturally hidden secret key or an encrypted object code block that must be decrypted in real time prior to execution. In the first case, the code block execution can be completely transparent to the control mechanism, which means that the execution speed should be minimally affected. In the latter case the code block to be run may be decrypted prior to execution, so there is most likely a concurrent loss of performance due to the latency of the decryption process. In this latter case, however, the object code may be relatively safe from disassembly and is thus potentially more difficult to subvert by would-be attackers. Embodiments discussed herein at a later point disclose systems and methods that can be implemented in a large continuum of possible solutions, ranging from a highly secure encrypted object code method to a relatively higher-performance, but nonetheless still quite secure selectively-available, secret key method.

In one embodiment, hiding the secret key from the user of such a secret key may be accomplished in a method similar to the Harvard Architecture memory space bifurcation. In this embodiment, however, the distinction may be made that a secret key may be used in an encryption/decryption calculation, but never actually directly read by the processor. This distinction may be enforced by limiting the encryption/decryption operations to those that are either implemented in hardware or are pre-determined software macros (also known as micro code), fixed at the design time of the hardware. For example, in the case where a hardware secret key may be used by any arbitrary code, even though it may not be able to be directly read by the processor, it can nonetheless be readily determined by simple calculations. Thus, it may be desired to specify that only security-related calculations may access the hardware secret key to differentiate such code segments from more general purpose, but less secure code blocks.

This distinction may be accomplished, in certain embodiments, utilizing validation methods substantially similar those described herein. If embodiments of the adaptive digital signature methods described earlier are utilized to determine whether or not the hardware secret key may be accessed, then it can be readily and reliably determined if the target processor is executing security-related calculations (i.e., calculations performed when the target processor is operating in "Secured Execution" mode) and those that are not secured. In addition, recursive methods substantially similar to those outlined earlier may be utilized to keep any intermediate key results hidden from discovery until the final calculations are completed and the fully decoded result is reported. Thus, embodiments described herein may have the ability to decode an encrypted digital bitstream without ever exposing the secret global key that is used to generate that same bitstream.

Code Execution Control

Methods for ensuring that a particular code segment is executed securely on a given processor have been widely studied for many years. Some of the earlier attempts to create secure code execution protection have included making modifications to the processor architecture in order to establish a set of "privileged" instructions. These privileged instructions were secured by designing the architecture such that these privileged instructions could only be executed when the processor was running in a particular mode, known as "supervisor" or "kernel" mode. This kind of bifurcation of the processor architecture has a number of drawbacks, including a potential loss of both processor generality as well as a potential degradation in performance. In addition to these drawbacks, such protective measures can often be bypassed by using specifically designed software calls to standard system routines in such a way as to take advantage of unexpected execution paths while the processor is executing in supervisor mode. Examples of such specifically designed malware attacks include so-called "stack overflow", "stack overrun" and "code injection" attacks.

A number of strategies have been devised in an attempt to help protect against these kinds of exploits, mostly based on various means of checksum verification or argument bounds checking. In the face of these kinds of protective measures, a variety of counter-counter-measures have evolved, including polymorphic viruses (i.e., self-modifying code). Other strategies for exploiting processor weaknesses in the face of bounds-checking include simply bypassing the bounds-checking "supervisor" routine itself. This kind of exploit is also used quite often in circumventing various copy-protection systems. As it turns out, the strategy of hijacking the supervisor routine is not unique to the world of computer security and is not at all a new concept. In fact, this exact problem has analogs in a variety of applications and has been referenced as far back as Plato in his work "The Republic". The basic problem is that, in any given system, one can always identify some sort of a global supervisor, with whom the ultimate security or stability of a structure is entrusted. Such a concept of a global foundation for all subsequent security functionality is known in the contemporary study of security systems as the "Root-of-Trust".

More recently, there have been some attempts to protect a processor against supervisor routine attacks by limiting the memory segments out of which the processor is fetching instructions to be read-only in nature (this includes the so-called WAX or "write-XOR-execute" approach). The concept of splitting an otherwise general-purpose computer's memory space into data-based and code-based partitions can be shown to be a variation of the so-called "Harvard Architecture." This method has a certain performance penalty associated with the protection mechanism as well as a concurrent increase in memory utilization. Finally, it has also been shown recently that even these kinds of defenses can be circumvented by the use of so-called "return-based" programming exploits or even by simple memory-aliasing exploits, where two separate execution threads can reference the same block of memory in different modes (one in "data mode" and the other in "execution mode").

Another proposed means of protecting the execution thread of a processor from being hijacked includes the use of encrypted code blocks. In this method, the code segments to be executed are pre-encrypted and thus, non-readable (and perhaps even more importantly, non-alterable) prior to their loading into the processor. This method also has several weaknesses. First, the code segment itself may be protected, but the arguments are not necessarily provided with the same level of security. Thus, a completely legitimate and secure code segment can be nonetheless provided with bogus arguments from its calling routine that can cause it to behave in an unexpected fashion. Second, in some cases, the execution thread is not necessarily protected against the return-based programming attacks described above. Also, if the processor bus can be readily observed by the attacker, then the long-term observation of both correctly-executed (even though encrypted) code segments as well as the observation of exception faults caused by improperly encrypted code segments injected into the executable stream can help to reveal the encryption key using a modified dictionary attack methodology. Finally, the processor performance in such a system is necessarily severely degraded over similar, but non-encrypted code systems. This performance penalty can be caused by a number of issues, the most significant of which is the latency incurred by the requisite decryption of the code block between when it is fetched from memory and when it is available to be executed. Although most modern processors use a pipelining mechanism to attempt to increase the number of instructions that can be executed in parallel (by various means), a block of encrypted code cannot be read into such a pipeline until it has first been decrypted. In the case where the code branches frequently, the decryption process can potentially take much longer than the code execution itself, even with a hardware-assisted decryption.

Embodiments of the systems and methods described in this invention may allow the utilization of unencrypted code blocks, so the performance penalties associated with encrypted executables are thus less of an issue. However, in the case where the execution efficiency is not a substantial concern encrypted code blocks may still be utilized. Thus, embodiments disclosed herein may have both the efficiency of plaintext executables as well as the added security of encrypted code segments utilizing the same or similar methods and systems. In addition, embodiments of the security systems and methods described herein can be updated in-situ to address newly discovered security concerns as well as to add new functionality after an embodiment has already been deployed.

Embodiments of the invention may attain these advantages, among others, by ensuring that a "secured code segment" is validated prior to execution by means of a cryptographic hashing function. This validation may be accomplished, for example, by authenticating a message digest or digital signature created for such a secured code segment. In the case where the evaluation of this cryptographic hashing function occurs in conjunction with the encryption of the resulting message digest using a compound key structure as described earlier to form a digital signature, a particular code block can be uniquely associated with a specific target unit or processor. This process will be referred to herein as "secured code binding", based on the fact that in certain embodiments this secured code block can be cryptographically bound to a specific target unit using the compound key based digital signature.

Although executing such a hashing function may not be resource free, an advantage of this approach is that the secured code segment can be introduced into the execution pipeline prior to completing its cryptographic validation. Thus, the hashing function can potentially be evaluated in parallel with the execution of the secured code segment itself (in a manner similar to speculative branch execution). In this embodiment, the results of the secured code segment may be utilized only if the resulting message digest is determined to be genuine. However, in another embodiment, the results of the secured code segment may be utilized in subsequent operations, but the results themselves may be different depending on whether or not the processor is operating in secured execution mode. This embodiment is substantially similar to the process described earlier for the evaluation of a compound key for use in a digital signature and can be generated by use of the hardware such as that depicted in FIG. 15.

The use of cryptographic validation does not, however, preclude the use of encrypted code segments. In fact, the use of a message digest or digital signature of the correctly decrypted code (the secured code segment in its original state before applying any type of encryption) may provide an additional level of protection. This is due to the fact that the prospective attacker would have to have a-priori knowledge of the correctly decrypted code block in order to create a counterfeit message digest. Thus, if both the code segment validation as well as the encrypted code methods can be used at the same time, higher robustness against attack may be realized.

As may be also be realized, however, there are several methods by which such hashing validation could be bypassed, the simplest of which would be to subvert the hashing function itself. Even if it is assumed that this strategy is not possible with certain embodiments (by utilizing a hardware hashing function, for example) it still could be possible to attack the security of such an embodiment by providing an impostor code segment along with a properly validated message digest. Since many message digests are actually encrypted to form a digital signature, then on the surface, this attack strategy would seemingly prove difficult. However, even a digital signature mechanism could potentially be attacked, either by spoofing the public key lookup portion of the digital signature, and thus providing an artificial validation of the impostor digital signature or alternately, by a malicious subversion of the signature validation routine itself.

These limitations are overcome in embodiments of the systems and methods disclosed herein by doubly encrypting the message digest associated with the secured code segment; once with the (global) "author's" secret key and then once again with a secret key known only to the endpoint "manufacturer" (which may not actually be the original chip manufacturer, but may be a secondary level distributor, system integrator, service provider, etc.) and the particular endpoint device on which the code segment in question is to execute. The advantage of this embodiment is that, even if the aforementioned digital signature is shared between similar endpoint devices, it will only function correctly on its intended target unit since the secret keys of different target units will differ. Thus, any such digital signature can be transmitted and stored in the clear.

Embodiments of techniques of doubly encrypting a secret (which may be used in so-called "layered key" systems as well as in a recursive security system) may have certain issues, if it is incorrectly used. First, if the intermediate result of such a layered encryption process is intercepted, then this intermediate key can be used to bypass the higher level security on any and all such systems. Also, note that, in the "lowest layer" of such a layered system, this intermediate result is actually a "global" decryption key that, if discovered, can be used to bypass the entire security system for all substantially similar endpoint devices. This kind of "intercept" attack has occurred more than once by simply watching for any memory transactions during the decryption process and then examining all such memory locations for a potential global decryption key. The process of watching for all memory accesses during a decryption process may seem cumbersome at first, but it is almost certainly a more efficient attack strategy than the brute-force guessing of the value of such a secret key. A second potential weakness in a layered key system can be exploited by a variant of the replay attack. In the case where a layered key system's security is compromised and its keys must be updated, then the old (compromised) keys may still be used if the original system is either reset back to its former state or if its former state is cloned by an impostor unit.

These weaknesses may be addressed in embodiments discussed herein using what we will refer to as a "compound key", as opposed to a "layered key" structure. One of the main differences between a compound key and a layered key is that all segments of the former may be evaluated in a single monolithic pass. By contrast, in a layered key system, the "outermost" layer key can be evaluated first, returning the next innermost key (which is then used to as an argument to produce the next layer's key, and so on, until the entire key stack has been traversed). The problem with this system is that the lower level keys can be intercepted and used later, effectively bypassing the outermost security layers. Thus, in such layered key embodiments the most important (in this case global) keys are those that are created and used last in the chain, where any additional (or more recent) layers of security are completely absent.

For this reason, a more robust manner to traverse such a security stack may be utilized such that the stack is traversed from the "inside out". This means that the most recent additions to the security chain are those that are executed first in sequence but are, in fact, located at the innermost layer of the security system. Accordingly, embodiments may be used to enforce such an "inside out" execution ordering. This particular ordering of code stack traversal can be accomplished by using a simple iterative approach, where the code loop first evaluates the current security level and then branches accordingly. However, in the iterative method, the intermediate results of the security system traversal can potentially be bypassed because, as noted earlier, the attacker could simply wait for the next lower level key to be exposed in a legitimate security system traversal and then use that intercepted key to clone a counterfeit "earlier" version of the system. Thus, embodiments of systems and methods are described that can not only enforce this "inside out" execution ordering, but also can protect intermediate results from being intercepted by malicious code or other well-known security system exploits.

Another major advantage when using such an "inside-out" security approach is that the entire sequence of calling arguments may be visible to the innermost layer (and thus, most recent version) of the security system. If this "inside out" execution sequence is implemented properly, then it can be seen that a correctly constructed bounds-checking mechanisms employed in such a system can have visibility over the entire calling chain. Thus, embodiments may have a built-in mechanism for performing a significant amount of the system attestation function without incurring any additional performance penalties most usually associated with such functionality.

Accordingly, certain embodiments may utilize a means to keep intermediate keys from being exposed to higher-level (and thus, less secure) security system routines as well as to ensure the proper security stack traversal method. One such method for achieving this is to use a recursive security structure, one embodiment of which is depicted in U.S. patent application Ser. No. 10/465,274, entitled "Method and System for a Recursive Security Protocol for Digital Copyright Control" by William V. Oxford filed Jun. 19, 2003, which has since issued as U.S. Pat. No. 7,203,844, on Apr. 10, 2007, which is hereby incorporated by reference for all purposes.

If embodiments of such recursive security protocols are utilized, certain advantages may be realized. First, the stack order traversal can be designed so that it must be evaluated from the "inside out". This means that the most recent security system additions are executed first and the system cannot be "started in the middle" (for example, as used in "return-based" programming exploits). A second advantage of a recursive system is that the addition of any updates to the security system may not change the original calling arguments at the security system itself. Accordingly, it may be more difficult to spoof the security system by using a traditional replay-based attack mechanism. While it is certainly possible for embodiments disclosed herein to employ inline execution stack with reverse ordering in an iterative fashion, the iterative mechanism may be subject to interruption and thus, it may also be possible to create a situation where a partial evaluation of the security stack is performed. This would potentially allow for one or more intermediate results to be intercepted by outside observers. In an inside-out security system implemented through recursion as may be utilized by embodiments herein, intermediate results cannot be passed as an argument to the next level routine at any point; only the final results of the security system layer being currently executed are available to the next level up in the security system stack.

The compound key structure may also be protected from partial evaluation by tightly controlling accesses to a target unit's secret key in certain embodiments. For example, if the secret key is stored in an inaccessible memory location which is not architecturally visible, then it may only be accessed as a part of a particular security-related instruction or function. In certain embodiments this function or instruction is one that may not be easily reversed such as a non-trivial one-way transform. That way, even a counterfeit security system should not be able to reveal the value of the secret key. Consequently, by only letting the secret key be referenced indirectly as a part of a one-way function the secret key may be protected as the secret key can never be used by itself as a part of a mathematical operation, but only as a part of a hashing operation either alone or along with some other datum, where only the result of the hashing function may be observable.

Additional mechanisms to protect the secret key may also prove useful in certain embodiments. One such potential mechanism is the use of a compound key, where the target unit's secret key is tightly coupled to some other constraint or a set of additional operands. Examples of such secondary operand may include a separate secret key, a globally visible register (such as a timestamp or system version number), the message digest of the code that is accessing the secret key, etc. In embodiments of such a system, this last example could ensure that the secret key may only be accessed by a segment of code that is authorized to use that very same key. Furthermore, if the message digest is encrypted to form a digital signature and if the key that is used to encrypt that message digest is the secret key itself, then a circle of dependencies can be created that can ensure that the only method to access a secret key is by using a code segment that was authored by someone who already knew what that secret key was.

In this case, the use of a compound key structure allows us to validate the "authority" of a piece of code that requests use of the target unit's secret key before it is allowed to use that key. Recall that the difference between a "layered key" structure and a "compound key" structure is that in certain embodiments, the latter may be evaluated in an atomic fashion, which itself can be accomplished by recursive means. If it is attempted to assemble a similar structure using an iterative approach, as opposed to a recursive structure, then there may be a risk of exposing the intermediate results of the key evaluation process (and thus, potentially exposing the secret key). This "exposure" may occur when secret keys (or their progenitors) are stored in publicly available locations, such as general-purpose registers that are pushed out to main memory when an interrupt occurs (or even directly in memory itself).

A potential security breakdown that may be addressed in certain embodiments is the protection of partial results when a security stack operation is interrupted in mid-evaluation and the state of the target unit's processor is then written out to main memory, where it is open to examination by outside observers. In one embodiment, to prevent this memory "exposure" heap pushes are disallowed while the processor is in secured execution mode. If that condition is enforced, then the recursive security protocol cannot be interrupted without losing its current state (since there are no intermediate arguments). It should be noted that, in embodiments of a recursive security protocol, the entire security protocol has been traversed when the recursion has terminated and the processor is running in secured execution mode, so there may be no more pushes of any arguments onto the heap in any case other than an interruption. Thus, if a compound key evaluation is interrupted at any point, and if heap pushes are disallowed in secured execution mode, then the security system stack traversal may not be restarted in mid-execution (i.e., the calculation must restart from the beginning). Thus, the recursive security protocol can be used in this manner to prevent any intermediate results from being stored on the system heap (and thus potentially exposed to unauthorized observers). Of course, in certain embodiments it is possible to disable heap operations during an iterative security system evaluation and thus, effectively requiring that such an interrupted security system operation must be restarted from the beginning. However, such an iterative approach may not enforce all of the conditions that the recursive structure provides, such as the "inside out" execution ordering the protection against "return-based" programming exploits, the ability to add subsequent security layers in a manner that does not alter the calling arguments to the original function as well as the isolation of the intermediate results and the final function output results. The mechanism by which the security system recursion terminates and the processor is allowed to enter secured execution mode will be described in more detail.

Terminating the Recursion

In one embodiment, the recursion can be signaled to terminate when the message digest of a given code segment matches that supplied with the code segment itself. This methodology may be made more robust against attack if the message digest is calculated by means of a hardware hashing function. A digital signature may also be utilized in certain embodiments. A digital signature mechanism has the potential to provide at least two main attributes: 1) an assurance that the code segment has not been tampered with and 2) ready identification of the code segment author. However, in the case of embodiments where such a digital signature is cached in publicly visible or modifiable locations, additional security may be desired since the digital signature itself may be modified at any time and thus may not necessarily be genuine. Thus, in these types of embodiments, a public-key system may be used to validate the digital signature or a compound key structure (as described above) may be used to assure that the digital signature provided with the code segment in question was created by some party who was in possession of the target unit's secret key. For the latter case, the use of that compound key may also be limited to a single endpoint or some set of endpoints. Additionally, both the public-key as well as the compound key approaches may be utilized in tandem. In that manner, it can be guaranteed that both the code segment is genuine as well as that the code segment is intended for the recipient of the compound digital signature.

It is also may be desired, in certain embodiments to validate the security mechanisms on the target unit. While a hardware-generated digital signature for any one segment of the security system on the target device may be utilized, in the case where the security system is recursive, a distinct digital signature can be substantially automatically generated as the security system itself is traversed. As mentioned earlier, once the execution of a recursive security protocol has terminated, the entire calling chain has been exposed. Thus, the innermost (and thus, most recent) portion of the security protocol has access to the entire environment in which it has been invoked, potentially including the calling arguments stored on the stack as well as other environmental variables that are stored in the system heap (or even elsewhere in memory). This built-in system attestation mechanism is particularly efficient as well as robust against attack since it is evaluated concurrently with the traversal of the security protocol itself.

In one embodiment, then, a set of conditions that must be in place before the "execution phase" of the security system stack traversal may be specified. In one embodiment, these conditions can be expressed as an "intersection set" of all of the individually required security conditions. That way, when new security risks are discovered additional conditions which account for those risks may easily be put in place. These conditions can ensure that no portion of the security system will be allowed to execute until all of the conditions, both new and old, are met. This "intersection set" of the various security system conditions can be achieved through the use of a compound key structure mechanism as discussed above. If, for example, one of the components of such a compound key structure is based in part on a target unit's secret key, then this secret key can be considered as one of the "Roots-of-Trust" of the entire security system. Furthermore, if a hardware-based timestamp mechanism is utilized as one of the other components of the compound key, then the system can be better protected against replay attacks. There are a number of components in addition to the above that could be employed in certain embodiments to enforce other conditions. Such components include using a hardware-based hash calculation of the message digest of a code block as a part of the compound key in order to prevent the key from being properly evaluated if the code has been tampered with. In one embodiment, another such component may be a digital signature of some selected subset of the calling arguments of the code block to be executed, which could protect against stack overflow style attacks.

In the case where the code segment has other constraints on its execution, such as time stamp or usage-related limitations, in certain embodiments, further terms can be added to the compound digital signature to ensure that those constraints are also properly enforced. It should be noted that this same mechanism can also be used to force specific multiple iterations through the various security stack layers by enforcing the proper code branching within each layer of the system, based on the correct evaluation of the intermediate security tokens.

As we have described above, embodiments of a recursive security system are advantageous in certain embodiments where it is desired to ensure that all of the conditions are in place prior to beginning to evaluate a security token. A recursive system with its ability to enforce of inside-out security stack traversal and limits on the visibility of intermediate results can thus provide an enhanced robustness against external attack as well as flexibility when it is desired to add more constraints on the security system evaluation in a minimally disruptive fashion.

It should be noted here, that the recursive traversal of the security system stack does not necessarily equate to a recursive form for the overall algorithmic flow. Thus, the logical flow of the security system and that of the code threads that are making use of the system's security system may be completely distinct.

Additionally, in certain embodiments by including a set of functions to specify how the digital signature is modified as a particular code segment is parsed, the flexibility of how the digital signature is used may be increased. For example, if a code segment is allowed to pass the digital signature through the parsing process unchanged after the first iteration, then that code segment can be validated without having to specify in advance how many times the security system cycles through that particular code block. Similarly, it could be specified that the digital signature would be reset to a known "seed" state as a particular code segment is encountered. Thus, simply by supplying a single unique number (which can be stored in the clear) a unique variation of how many times and in what order the various portions of the security system are traversed may be specified. In fact, such a code validation process can be used to implement a variety of useful functions and thus, this technique does not necessarily have to be limited to the exclusive use of the security system itself.

In the case where the proper digital signature is supplied with generic code (code which may or may not be related to the implementation of security) the manner in which that particular block of code will execute on a specific target unit may be quite specifically controlled. This is a very powerful mechanism that can be used for securely distributing generic code to a set of target devices. This method of distribution may be, for example, effectively applied to free or paid upgrades to applications or to manage the spread of software viruses and other undesirable malware. In this latter embodiment, a recursive security system could be used to validate each and every code block that is a candidate for execution on a target device. Thus, a malware application or even a polymorphic viral attack on previously authenticated code segments could be prevented from executing.

In order to provide the ability to incorporate hardware dependencies into the security system evaluation, in certain embodiments, a hardware-implemented version number may be utilized as one of the compound components of the digital signature evaluation. If the hardware version number is updated each time the security system is modified (and if that update is secure), then it can be ensured that the security system is matched to the target unit on which it is executing. Note that this is distinct from the time-stamping mechanism described earlier, although the two may be used together in a compound key evaluation to protect against replay attack scenarios or other violations.

If we use a hardware-derived checksum, such as a JTAG signature, for example, as a part of our compound key structure, then the hardware implementation itself may be authenticated. This kind of mechanism could then ensure that the software and hardware are a matched pair and that the hardware is itself authentic (or has not been tampered with). Furthermore, if the JTAG signature that is used as a part of the compound key evaluation is not directly observable (for example, it is taken from a point in the scan chain where its state is neither externally visible nor architecturally visible), then the difficulty of mounting a potential attack based on cloning the hardware can be increased many fold. This strategy can be made effective, for example, if the device's individual serial number is included in this scan chain.

It should be noted here that, from the processor's perspective, in essence, there may be no logical difference between an encrypted code block (which is not directly executable) and an "outdated" code block, which might have possibly been executable at one time, given the correct digital signature matching, but is no longer executable, because its digital signature is no longer valid. This scenario may occur, for example, because the target device's timestamp register has been changed or, alternately, if the target device's hardware has been modified in some unauthorized manner.

Thus, in the case where a particular code block is replaced with an updated version (even though both are potentially executable), in one embodiment, a simple but yet effective method for accomplishing this could be to first replace the decryption key pointer for the code block in question with a new pointer that leads to a means for replacing the old version of the code block with the updated version and then to update the target endpoint device's timestamp register. Here, the updated timestamp register value may invalidate all of the previous digital signatures that were generated using the old value and may thus entail that the entire security system be revamped (ideally in a secure manner) to bring it up to date and to replace the old digital signatures (or keys) with new key/digital signature values and updated functionality. This is a very powerful (and potentially very far-reaching) mechanism that can be easily affected with a single change to the value stored in the endpoint device's timestamp register. In this case, care should be taken that the endpoint timestamp register value does not get changed in an insecure or reckless manner. One embodiment of such a forced update scenario may be referred to as logically equivalent to adding a layer of encryption to an otherwise directly executable code block (simply by forcing a single digital signature mismatch).

Secured Mode and Secured Code Binding

In an embodiment where the system utilizes one of the architecturally invisible secret keys as described above, the code that makes use of such a key must be designed in a manner such as to prevent these secret keys from being compromised. As mentioned earlier, we can use a secured code binding mechanism to prevent the correct execution of an otherwise legitimate code block on a particular endpoint device when it is used in an unauthorized manner.

In one embodiment, this secured code binding is based on the requirement that the result of applying a specific kind of hashing function to a candidate code segment must match a specially pre-determined message digest provided with that code segment before that code segment is allowed to execute. This hashing function may be applied after a candidate code segment is called, but before it is allowed to execute. Once this hashing function has been initiated, any writes to that particular memory space comprising the candidate code segment may be either disabled or ignored. If the candidate code segment is located on the same chip as the CPU execution unit, such as in the CPU's instruction cache, then this may be easily implemented. However, in a multiprocessor system, where an I-cache may be shared between more than one processor residing on the same chip, for example, this may not be as straightforward to implement as it may seem on the surface. Another potential method to prevent the code from being modified after the message digest has been computed is to configure the system such that any attempted writes to that memory space that occur after the hashing function has been initiated will cause a processor interrupt. As described above, this may reset the processor's secure execution mode to its default initial "not secure" mode. Another response to such an intrusion might be to cause the secured execution thread to be terminated with an error by initiating a memory segmentation fault, for example.

If the calculated message digest of a candidate code segment matches the pre-determined message digest received with the candidate code segment, then the candidate code segment is allowed to execute in what is termed "Secured Mode" or "Secured Execution Mode". As described earlier, only code that is operating in Secured Mode can utilize the architecturally invisible secret key. If a particular code segment is not operating in Secured Mode, then the secret key(s) are disabled and any reference to one of them will return some other value (such as zero).

In certain embodiments, the hashing function utilized used in calculating the message digest for the candidate code segment may have certain properties. The first property is that the hashing function may be implemented in the hardware of the target unit. This means that this function cannot be completely replaced by some other, (perhaps subverted) version of this original hardware hashing function. It should be noted that this hashing function may be supplemented by a refined version (or even a conditioned outright replacement) of the original function when desired. In one embodiment, the method for replacing the hardware hashing function with a refined version would be substantially similar to the procedure described earlier that is used to insert new layers into the security system, through a recursive definition of the security system's structure. However, it should be noted that in this case, even though the new hashing function could replace the original function for the purposes of all subsequent security system operations, this new hashing function itself may still rely on the original hardware hashing function as the foundation of its root of trust. Thus, the use of the term "conditioned outright replacement". In one embodiment, the original hardware-based root of trust may remain constant. This may be desirable in that it can be very difficult to undermine such a hardware-based security system. However, if a shortcoming in the original hardware hashing function is found after the target device has been deployed in the field; such a shortcoming can potentially be contained by using the original hashing function in a single application, where the calling arguments can be effectively limited.

A second property of the hardware hashing function is that it may use the architecturally invisible secret key as its seed value. Thus, even given the same input arguments, the message digest result of such a hardware hashing function can differ from unit to unit. This difference can be exploited in that it could result in a unique message digest for each and every target unit. This property is similar in concept to that of a digital signature, but it does not necessarily require the addition of a separate encryption/decryption block to the hardware hashing function. Since the candidate code segment is then constrained to execute (at least in Secured Mode) only on units where the hardware-produced message digest matches that which is distributed with the candidate code segment a circular dependency has been created. This circular dependency means that only code whose message digest has been created with the secret key of the correct target unit can actually make use of this same secret key. This property substantially impairs the ability for a would-be attacker to create a code segment which would be allowed to execute in secured mode on a target device.

The mechanism described above is termed "Secured Code Binding", since a code segment can be "bound" to a particular target device (or even to a specific set of endpoint devices). As mentioned earlier, in the case where an executing block of secured code is interrupted, then the context is not saved and thus, the execution of this code segment must either be abandoned or restarted from the beginning. Also, once the execution of a code segment in secured mode is interrupted, the processor may no longer operate in secured mode and any access to the architecturally invisible secret key(s) may be cut off until the processor returns to secured mode. In certain embodiments, any off-chip store operations may also be controlled, or prohibited while the processor is operating in secured mode.

As discussed, in certain embodiments, each target unit may have a unique set of architecturally invisible secret keys. In other embodiments, however, some subset of these keys may be common to a number of identical devices. Thus, a particular code segment can be bound to a particular class of endpoint devices with a common subset of keys, while still protecting this set of architecturally invisible secret keys that are held in common between such devices. The combination of the hardware hashing function and one or more architecturally invisible secret keys may thus provide the basis for a chain of trust for a highly effective and robust recursive security protocol.

Implementation details of the various embodiments will now be further described using the attached figures. Note that, in all of these examples, the term "Digital Bitstream" refers to a generic collection of digital data and thus, this term may be used interchangeably with the words Digital Content, Code Block or Digital Data Set. In the case of the Code Block term, the referenced data can be further assumed to represent an executable file, an executable script or even an algorithmic description or block of pseudocode.

Figure 3:
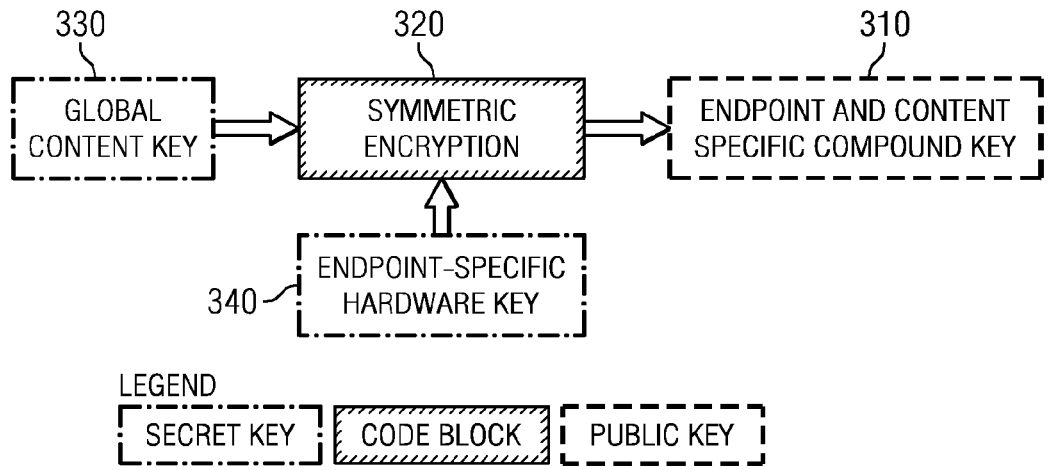
FIG. 3 depicts one embodiment of the creation of a compound key.

FIG. 3 depicts one embodiment of the creation of a compound key for digital content. This compound key 310 may be created by applying encryption engine 320 to a global content key 330 (which may be provided or determined by the owner or author of the digital content) utilizing an endpoint specific hardware key 340, which may be an architecturally invisible secret key (as discussed above) associated with a particular endpoint device (target unit). The resulting compound key, which is specific both to the particular endpoint and the digital content may be transmitted and stored to, and stored in that clear, on an endpoint device to which the compound key is provided.

Figure 4A:
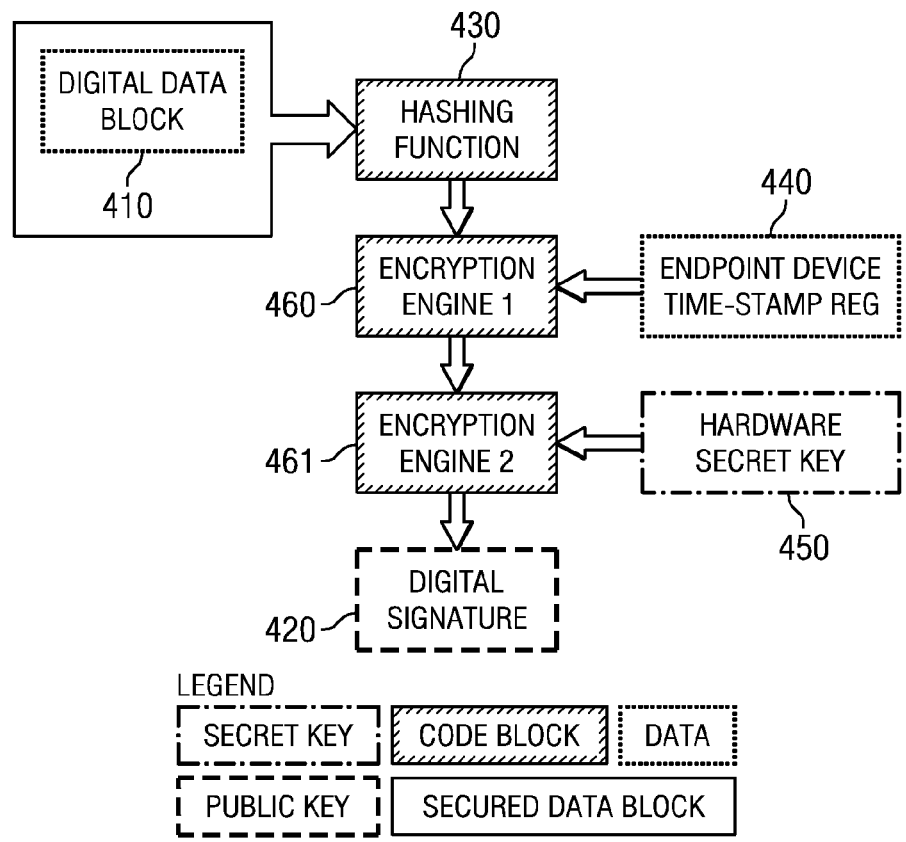
FIGS. 4A and 4B depict embodiments of the creation of digital signatures or their equivalents.

FIG. 4A depicts one embodiment of the creation of a secured digital data block structure. In this embodiment, the digital data block 410 may not be encrypted, but a digital signature 420 is formed by encrypting the message digest calculated by the Hashing Function 430 from the digital data block with one or more tokens 440 or 450. These tokens may be either secret keys or publicly available data, such as a timestamp. Note that the methods employed to encrypt the data passing through the encryption engine(s) 460 and 461 may or may not be identical. In the case where a secret key is used as one of the encryption keys, then it may be more difficult to forge the Digital Signature without knowledge of that secret key value. It is also instructive to note that the order of the encryption operations 460 and 461 are not relevant to the overall security of the result, but the resulting Digital Signature 420 will be different if the order of the operations is changed.

Figure 4B:
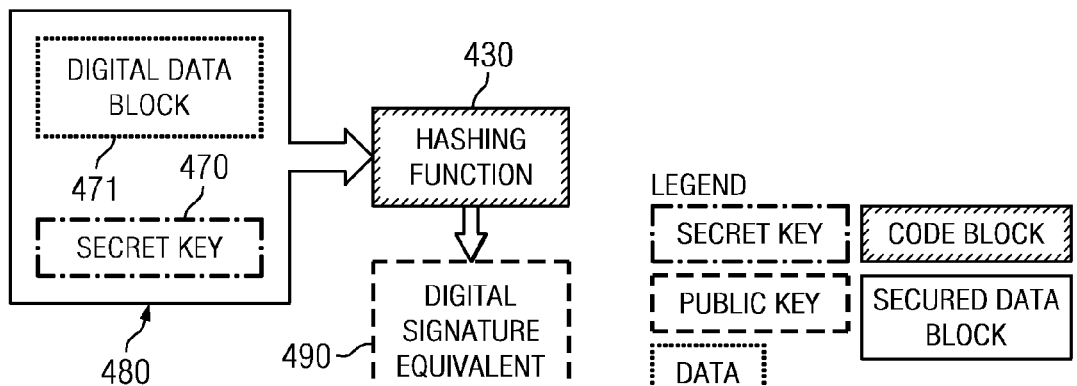

FIG. 4B depicts an alternate embodiment of the creation of a secured code block data structure. In this case, a secret key 470 is appended to a digital data block 471 to form an overall message 480. As before, it is not necessarily relevant to the robustness of the resultant security whether this appending action places the secret key 470 before or after the original digital data set 471, but the end result will differ if the order is changed. Note also that, to ensure security, secret key 470 should not be published along with the original digital data set 471. Therefore, the published data set would be restricted to just the digital data set 471 rather than the entire data structure 480. This entire data structure 480 is then run through a hashing function 430, in essentially the same manner as shown before with respect to FIG. 4A. In this embodiment, however, the final output 490 has many of the characteristics of the digital signature 420 shown in FIG. 4A, but may not require the use of encryption engine(s) 460 or 461. Thus, the result 490 of this operation will be referred to as a digital signature equivalent. It should be noted that this digital signature equivalent 490 is unique (assuming that the hashing function 430 is properly constructed) for each unique overall data structure 480. Thus, if the secret key 470 is shared only by the author of the digital data set 471 and the consumer of that digital data set (the endpoint device or target device), then only these two parties should be able to recreate the same correct digital signature equivalent 490. In this case, digital data block 471 may be considered to be "bound" to that secret key 470 (and thus, to the target device).

Figure 5A:
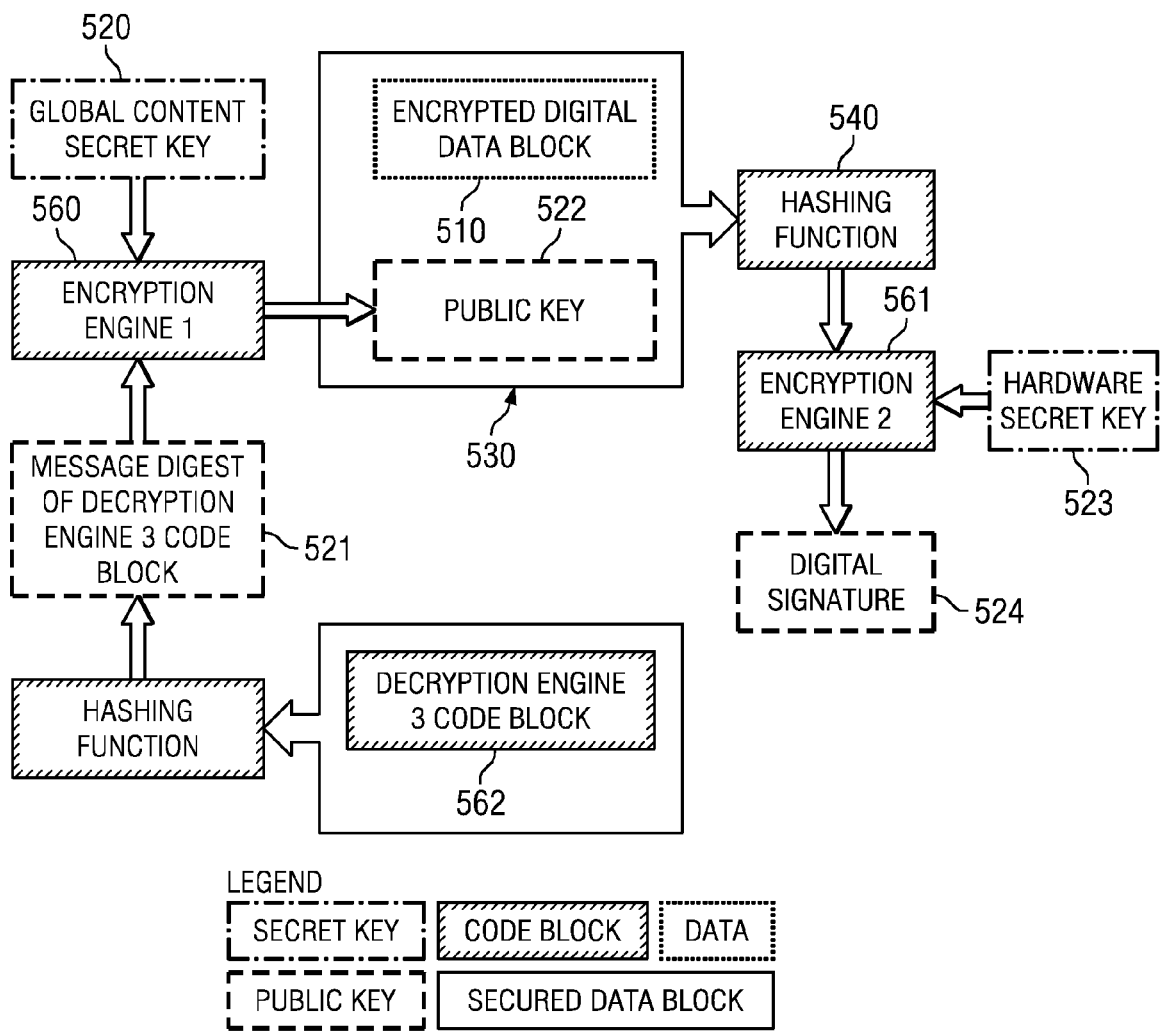
FIGS. 5A and 5B depict embodiments of the use of a compound key structure with a secured code block.

FIG. 5A depicts one embodiment of how a security system such as that described herein may be used to cryptographically bind an encrypted data block 510 to a specific decryption engine code block 562 and then to bind that combination 530 to a specific endpoint's hardware secret key 523 using a digital signature 524 that is calculated by means of hashing function 540 and an encryption engine 561. Note that, in this example, the Public Key 522 (which is constructed by encrypting the message digest 521 of the Decryption Engine Code Block 562 with the Global Content Secret Key 520) is publicly distributed along with the original encrypted data block 510 as a single concatenated data set 530. The act of creating a digital signature 524 from the message digest of the combined message 530 (which comprises the original encrypted data block 510 combined with the Public Key 522) ensures that only the properly authorized endpoint devices are able to decrypt the original encrypted data block 510, and not only that, but that this decryption process can only be accomplished by using the prescribed method of Decryption Engine 562. Note that more constraints can be easily added to the decryption authorization procedure by adding more components to the encryption engine chain 560 (such as a multi-term compound encryption, for example).

Figure 5B:
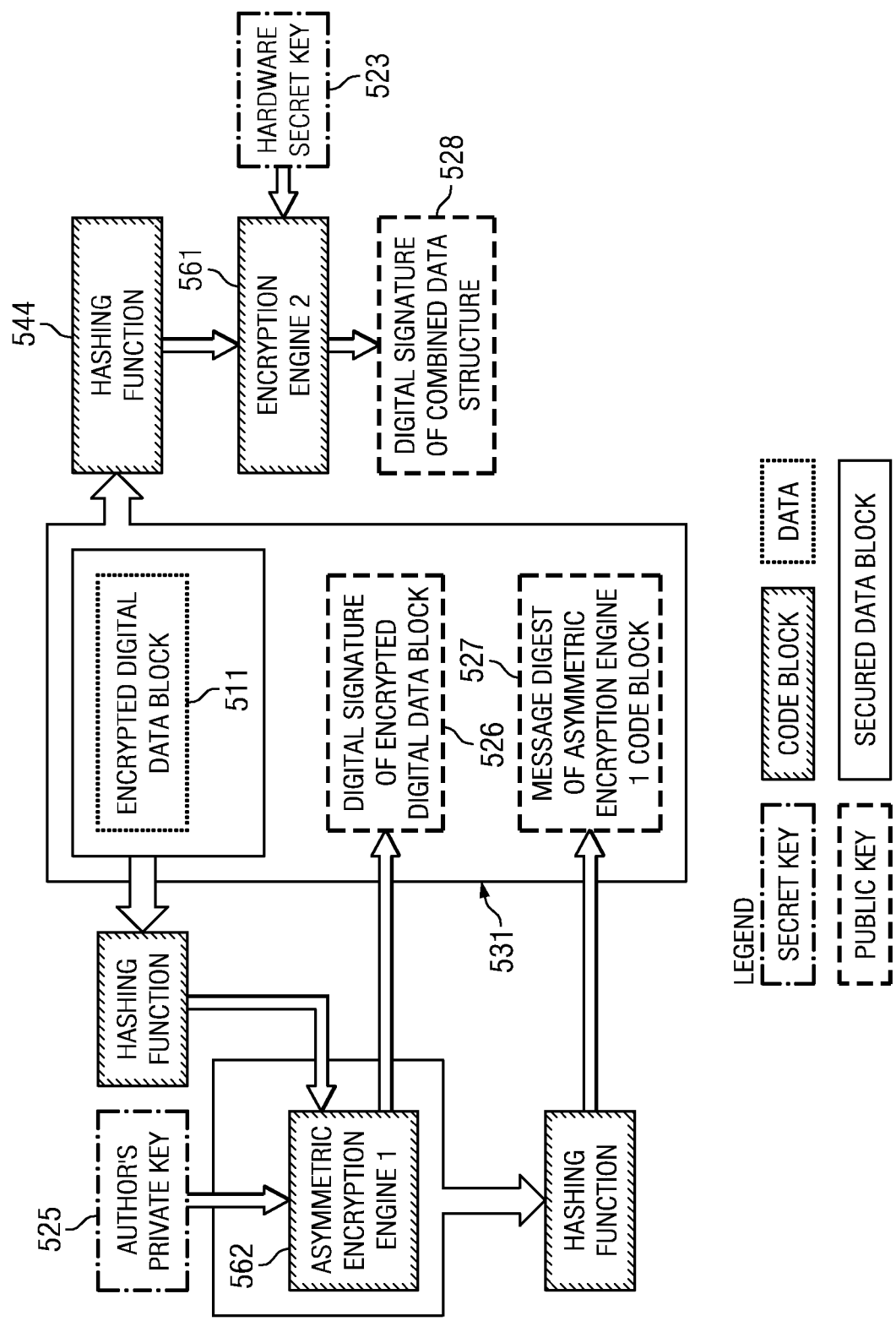

FIG. 5B depicts a variation of the embodiment shown in FIG. 5A. In this embodiment, the author of a particular encrypted message 511 can be unambiguously authenticated, but only on a specific endpoint device. Here, the original encrypted data block 511 is cryptographically bound to a specific decryption routine 562, as described above. At this point, it can further be specified that decryption routine 562 is an asymmetric encryption engine, where the input may be the author's secret private key 525, and the output would only be correctly decrypted using the author's public key. The message digest 527 of asymmetric encryption routine 562 is appended along with digital signature 526 to the original encrypted digital data 511 to form an overall data structure 531. Data structure 531 can then be cryptographically bound to a specific endpoint device by using that endpoint device's secret key 523, hashing function 544 and encryption engine 561 to form digital signature 528. With this embodiment, it can be ensured that the encrypted message 511 is genuine and its author is known as well as the fact that the author is in possession of the hardware secret key 523. It should be noted here that the term author as used herein does not necessarily mean the originator of data but may also refer to a licensor, distributor, or another type of entity which wishes to distribute or otherwise communicate such data. One example where this particular chain of trust can be of significant use is in the case where the endpoint device's security system is to be updated using a secured code block (which would be contained in encrypted form in the original data block 511).

Figure 6:
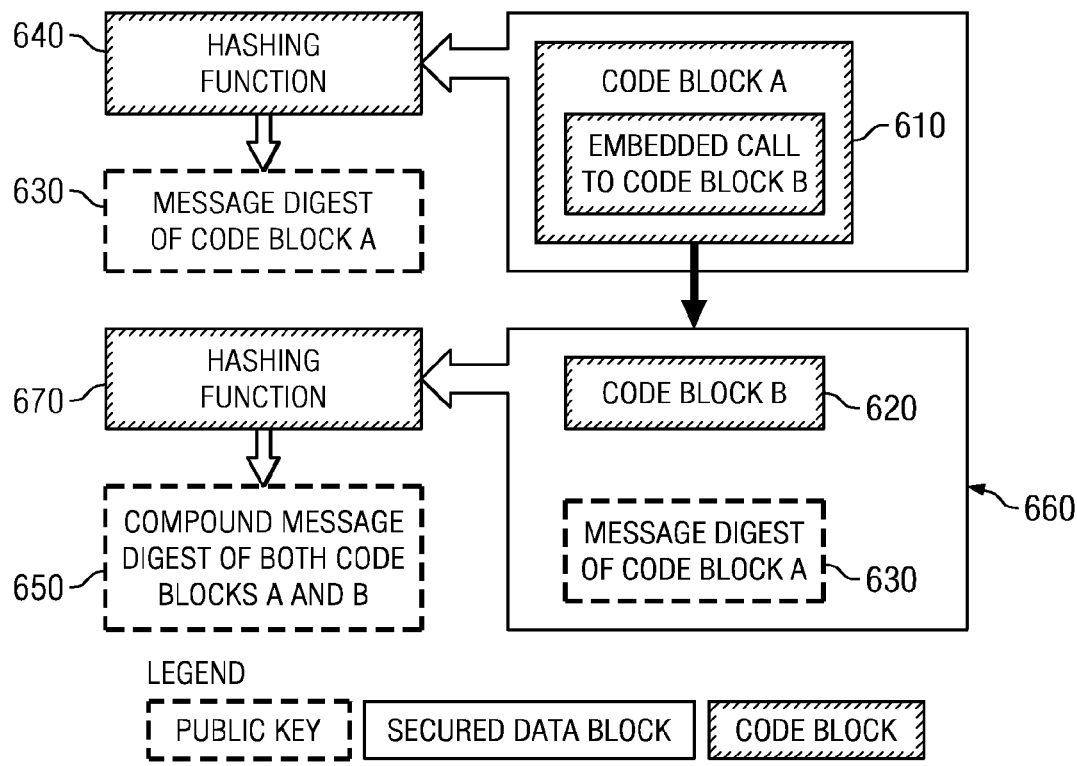
FIG. 6 depicts one embodiment of the use of a compound message digest.

FIG. 6 depicts one embodiment of utilizing a cascaded hashing method in order to control the execution of a secured code block 620. In this case there are two independent code blocks 610, 620. In this example, the first code block (secured code block 610) includes an embedded subroutine call to the second routine (secured code block 620). Thus, the message digest 630 computed by the hashing function 640 for secured code block 610 is dependent on the reference to secured code block 620 that is contained inside secured code block 610. This message digest 630 then links the two secured code blocks together from the perspective of secured code block 610. Next, the message digest 650 may be constructed for code block 620 using hashing function 670. However, in order to tie the message digest 650 to both secured code block 620 as well as its calling parent routine (in this case, secured code block 610), the original message digest 630 may be used as a seed to the message digest 650 that is computed by hashing function 670. Recall that such a seed value can be implemented in many ways, but one such method is to simply concatenate the original message digest 630 to the second digital data set (for example, in this case secured code block 620) to form an overall message 660. Overall message 660 is then run through hashing function 670 (which can either be identical to hashing function 640 or it can be some other independent hashing function) to form a second message digest 650, which is thus dependent on both secured code block 620 as well as the original message digest 630 (which is itself dependent on both secured code blocks 610 and 620). As we noted in the discussion of FIG. 4B, the order of these concatenated elements 620 and 630 may be important to the resulting message digest 650, but in the case of hashing function 670, the order of the elements comprising the overall message 660 may have no substantive impact on the security of hashing function 670.

This second message digest 650 can then be used in a manner substantially similar to that described above to ensure that secured code block 620 may only be executed correctly if it is called from code block 610. Note that code block 620 may actually be an exact duplicate (or equivalent reference) of code block 610, which would make this an embodiment of a recursive system. The only difference between the two instantiations of the same code block may be the particular message digest that is appended to the code block in order to form the secured code block message digest.

In this particular embodiment, note that we have not used any secret keys, so this type of structure can be used without specificity to enforce the proper execution order on any endpoint device that is using the same overall security system as described herein. Also, as before, a similar example may be constructed where the execution of either of the secured code blocks 610 or 620 is additionally constrained to a certain specific endpoint device or set of devices by utilizing a compound key-based digital signature structure or its equivalent in place of message digests 630 or 650 respectively.

Figure 7B:
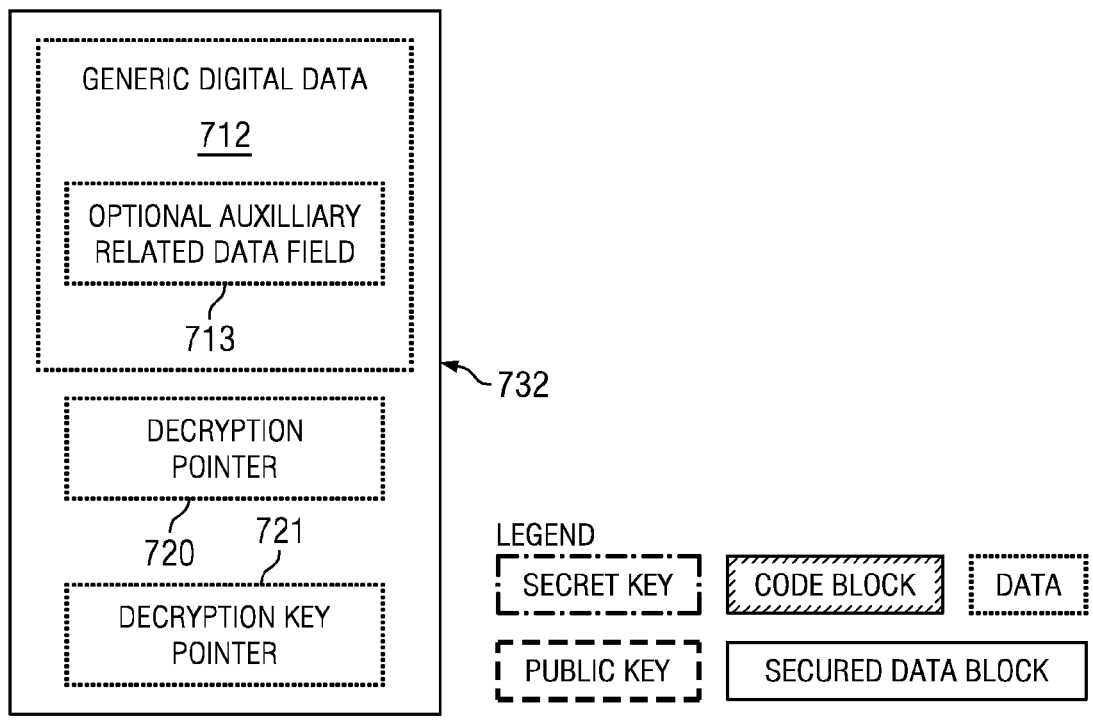
FIGS. 7A, 7B and 7C depict embodiments of a secured code block message.
Figure 7A:
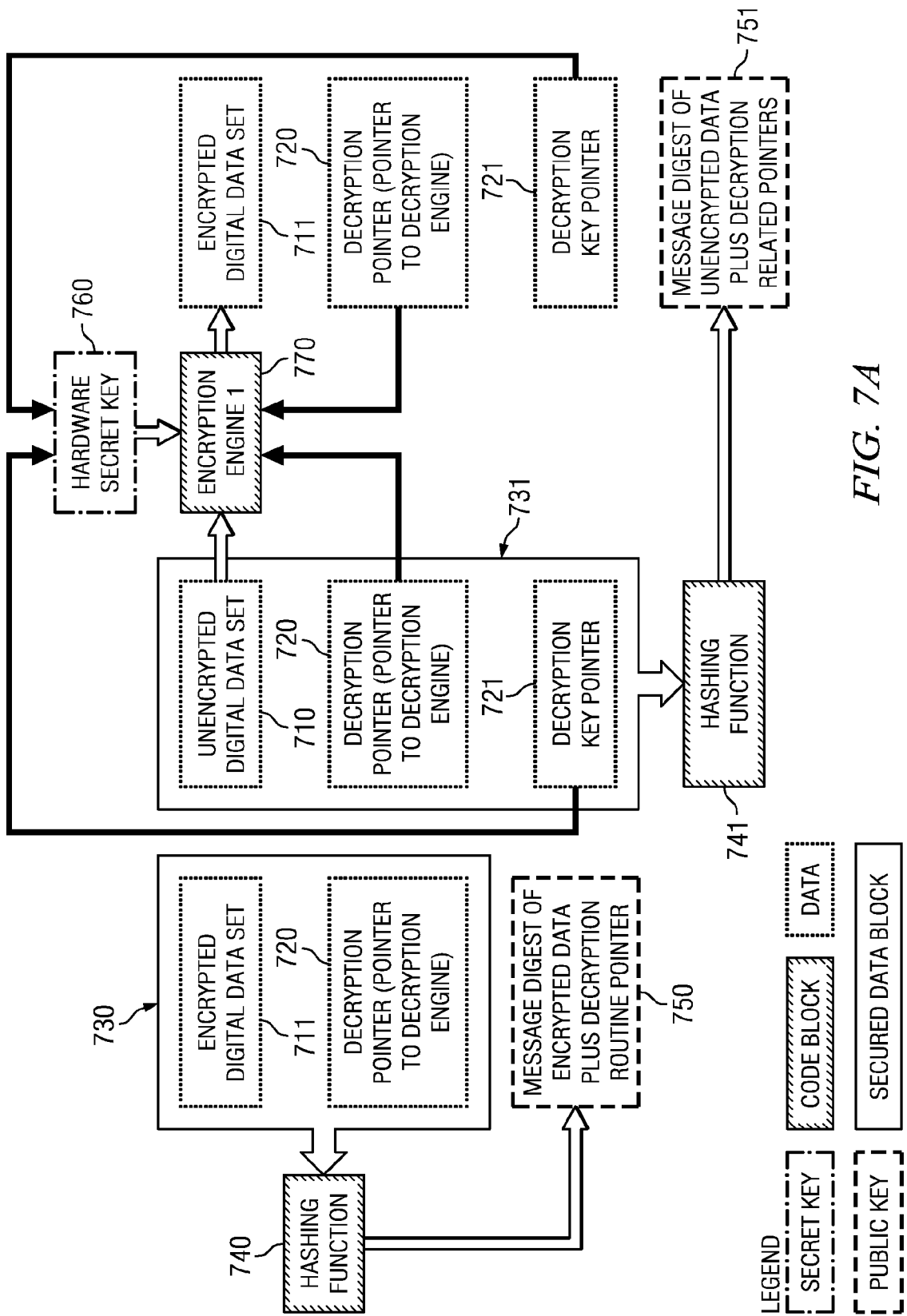

FIG. 7A depicts embodiments of the construction of a secured code block message. In one embodiment, the Encrypted Digital Data Set 711 has been encrypted using an encryption algorithm that is identified by pointer 720. The data structure 730 is formed by a concatenation of Digital Data Set 711 and Pointer 720. The message digest 750 of data structure 730 is generated by hashing function 740. This arrangement allows the cryptographic binding of an encrypted data set and its associated decryption routine.

In the second embodiment, an additional term is added to the concatenated data structure 731, namely the pointer 721 to the decryption key 760. It should be noted that this key 760 is not necessarily a hardware-based secret key as is depicted in this particular embodiment. In fact, the key 760 that is pointed to by pointer 721 may even be itself a data structure, as will be discussed in the description of FIG. 7C below. Otherwise, this embodiment is substantially similar to previously described embodiments. Encrypted Digital Data set 711 is created as a result of using encryption engine 770 and one or more keys 760 operating on the original unencrypted data set 710. The message digest 751 is generated using Hashing Function 741 on the concatenated data structure 731. In this case, there is now a mechanism for cryptographically associating the unencrypted data set 710 with both the encryption engine 770 as well as the unique key 760 that can be used to recreate the unencrypted data set 710 from the encrypted data set 711. As with previous embodiments, additional terms may be added to the encryption chain in order to cryptographically bind the entire structure to a specific set of conditions that are to be satisfied on a given endpoint device and its unique secret hardware key 760. It is worth noting that the format and encryption status (i.e., is it encrypted or not) of the digital data sets 710 and 711 may not be relevant to this process, since these details can be inferred from the pointers 720, 721.

With this in mind, FIG. 7B depicts one possible embodiment for a basic generalized format for a Universal Cryptographic Data Structure that can thus be used in a recursive security system. Embodiments of this structure may be simple and powerful, and can be implemented as a simple linked list of three basic elements; a generic data block 712, a decryption pointer 720 and a decryption key pointer 721. The overall linked list is bundled together in a data structure 732. By using a linked list, it can easily be seen that the ordering of the elements in the concatenated data structure 732 may not be relevant to its function, although it may have an impact on the operation or evaluation of the data structure. Another interesting aspect of using a generic (for example, not predefined) data block structure and a linked list format is that the three elements 712, 720 and 721 also do not necessarily have to be ordered linearly or even contiguously. Thus, one embodiment may comprise an auxiliary data structure 713 that includes some other independent, but perhaps related, data that is stored in conjunction with the overall data structure 732. One embodiment of this concept might be to locate the actual decryption engine code block 771, such as that which is pointed to by pointer 720 inside the auxiliary data structure 713 of FIG. 7. Another such example could be to store the actual key value that is specified by pointer 721 inside this auxiliary data block.

In both of these cases, the actual data contained in such auxiliary data blocks may be used in the process of generating a message digest or a digital signature as depicted variously in the embodiment examples presented in FIGS. 4A, 4B, 5A, 5B, 6 and 7A. As has been noted in this disclosure, the ordering of the various data fields stored in a concatenated data set may have an impact on the resulting message digest (or digital signature), if the hashing function is properly designed.

Figure 7C:
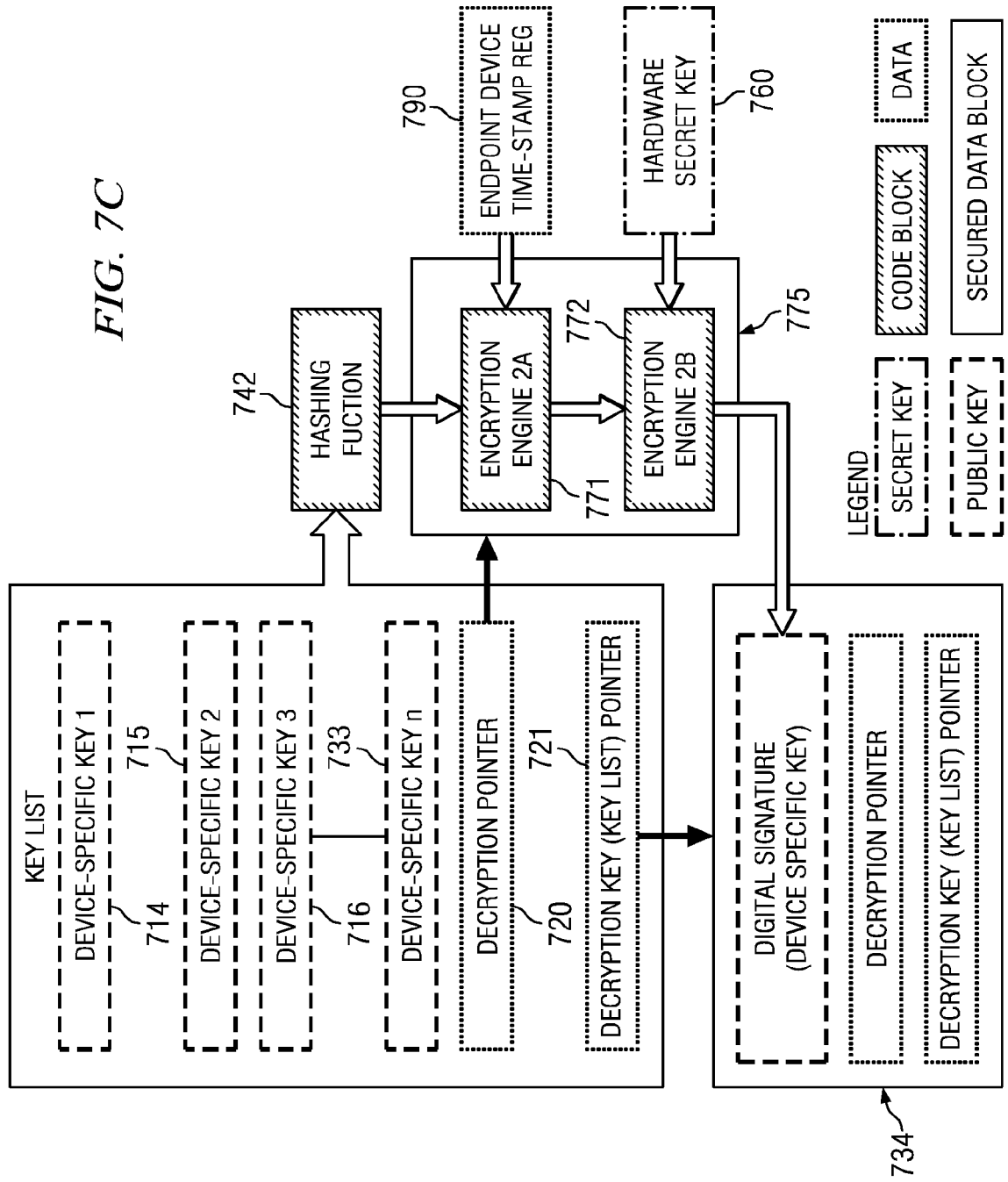

It will be apparent then, that a similar block structure may also be used to secure the keys that are utilized in certain embodiments. FIG. 7C depicts one embodiment of such a secured data block 733 which comprises only keys. Here, a data block may comprise a list of device specific keys 714, 715, 716 (or others, as desired). In this example, any of these keys may have been created using (for example) a secret key of an endpoint device 760, and an endpoint device timestamp register 790, which were encrypted using encryption engines 771 and 772 respectively. As was the case in earlier descriptions of such operations from a perspective of the security system's robustness, there is no requirement that encryption engines 771 and 772 should be distinct or even different and there may no fundamental limit to a certain number of these encryption operations in the encryption chain and, while the order of these operations may matter to the resulting compound keys, there is no requirement for a particular order for the encryption operations. One other feature of note in this case is that the key list pointer element 721 of the concatenated key list data structure 733 may point to yet another concatenated key list data structure 734. Since both of these data structures are of the same universal cryptographical format as depicted in FIG. 7B, the key list data structure can be formed in a recursive manner. Accordingly, the keys 733 for use in embodiments of such in a recursive security system may be protected in the same manner and using the same structures as any other data to which embodiments of such a security protocol may be applied and similarly, these protected keys may also be decrypted and authenticated on an endpoint device in the same manner as other data secured by embodiments of the systems and methods disclosed herein.

Figure 8:
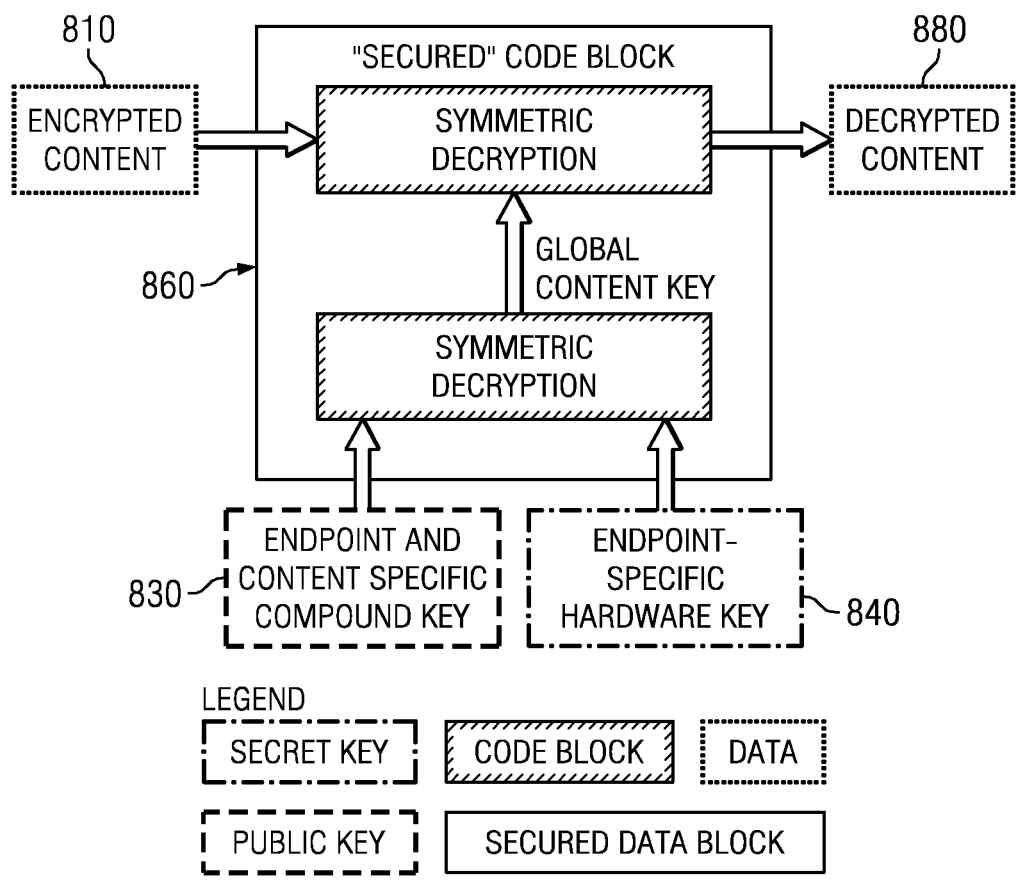
FIG. 8 depicts an embodiment of a decryption operation.

Turning now to FIG. 8, one embodiment of how a compound key may be utilized to decrypt encrypted content is depicted. This decryption operation may occur in "secured mode", as described above. Here, content 810 may be provided to an endpoint device along with a compound key 830 where the content has been initially encrypted using a global content key. The compound key 830 may be created as described above in FIG. 3. Accordingly, when the encrypted content 810 is received at an endpoint device it may be received with an associated compound key 830. Executing in secured mode, such that the secret key 840 at the device may be accessed, the compound key 830 may be decrypted inside of secured code block 860 to yield the global content key. The global content key may be used, in turn, inside secured code block 860 to decrypt the original encrypted content 810 to yield decrypted content 880.

Figure 9:
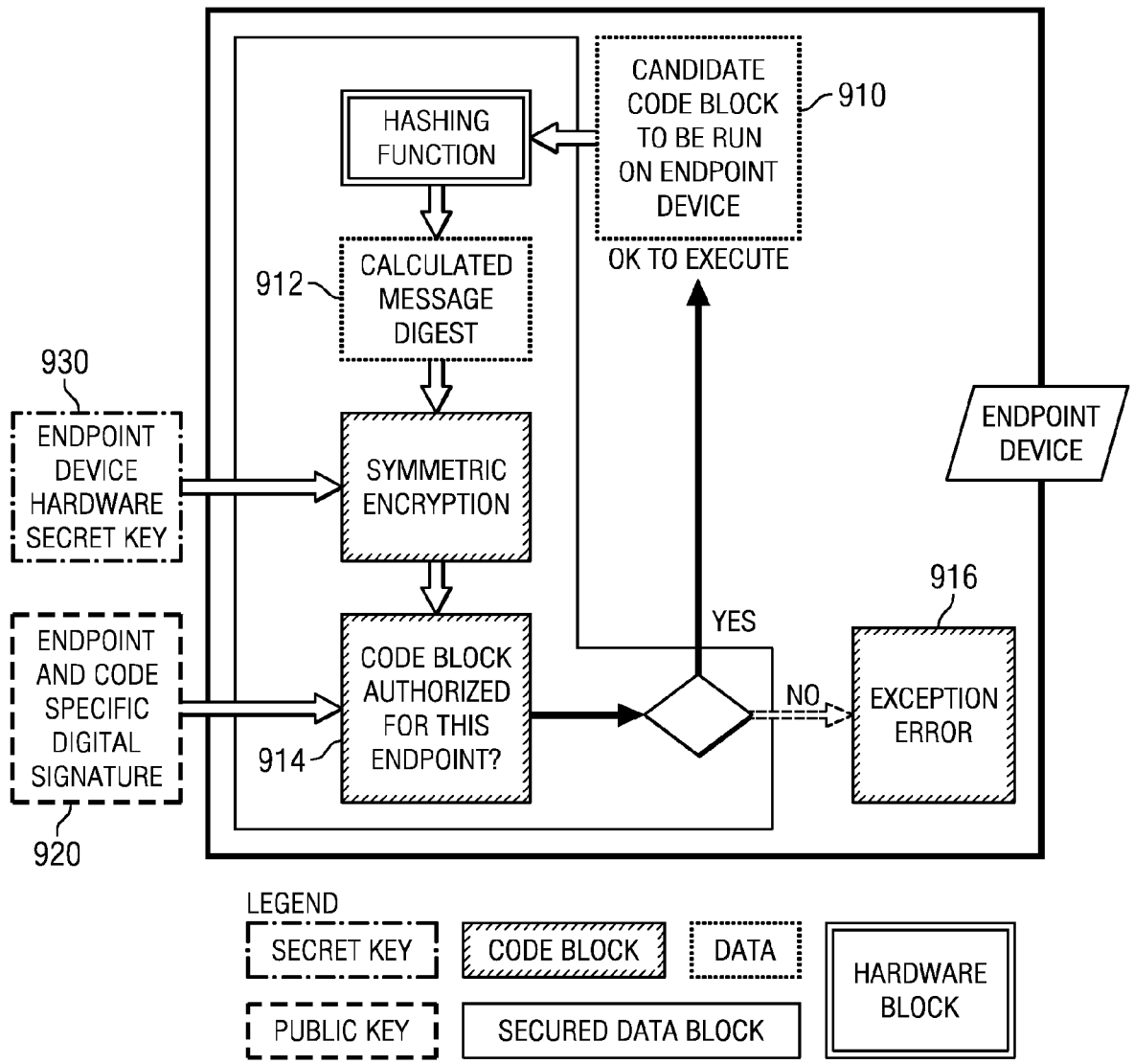
FIG. 9 depicts one embodiment of the use of a compound key.

FIG. 9 depicts one embodiment of how a secret key may be utilized to verify that a code block is authorized to run on a particular endpoint device before execution. Candidate code block 910 for execution may be provided to an endpoint device or may be obtained by decrypting encrypted digital content which was received (for example, as depicted earlier in FIG. 8). Additionally, the endpoint device may receive a corresponding digital signature 920 corresponding to the candidate code block 910. This digital signature 920 may comprise a message digest created from a code block (for example, by hashing that code block) which has been encrypted using the endpoint device hardware specific secret key 930. Thus, to verify whether the candidate code block 910 may be executed, an authentication operation may be implemented in secured mode whereby the candidate code block 910 is hashed to create a message digest (912). This message digest 912 can then be encrypted using the endpoint device hardware specific key 930 of the endpoint device (which may be accessible because the verification is occurring in secured mode) to create a digital signature that is compared with the originally supplied digital signature 920 in step 914. If this digital hardware-generated digital signature matches the received digital signature 920 corresponding to the candidate code block 910, then the candidate code block 910 may be considered verified and may be deemed executable, otherwise an exception error may occur (step 916).

Figure 10:
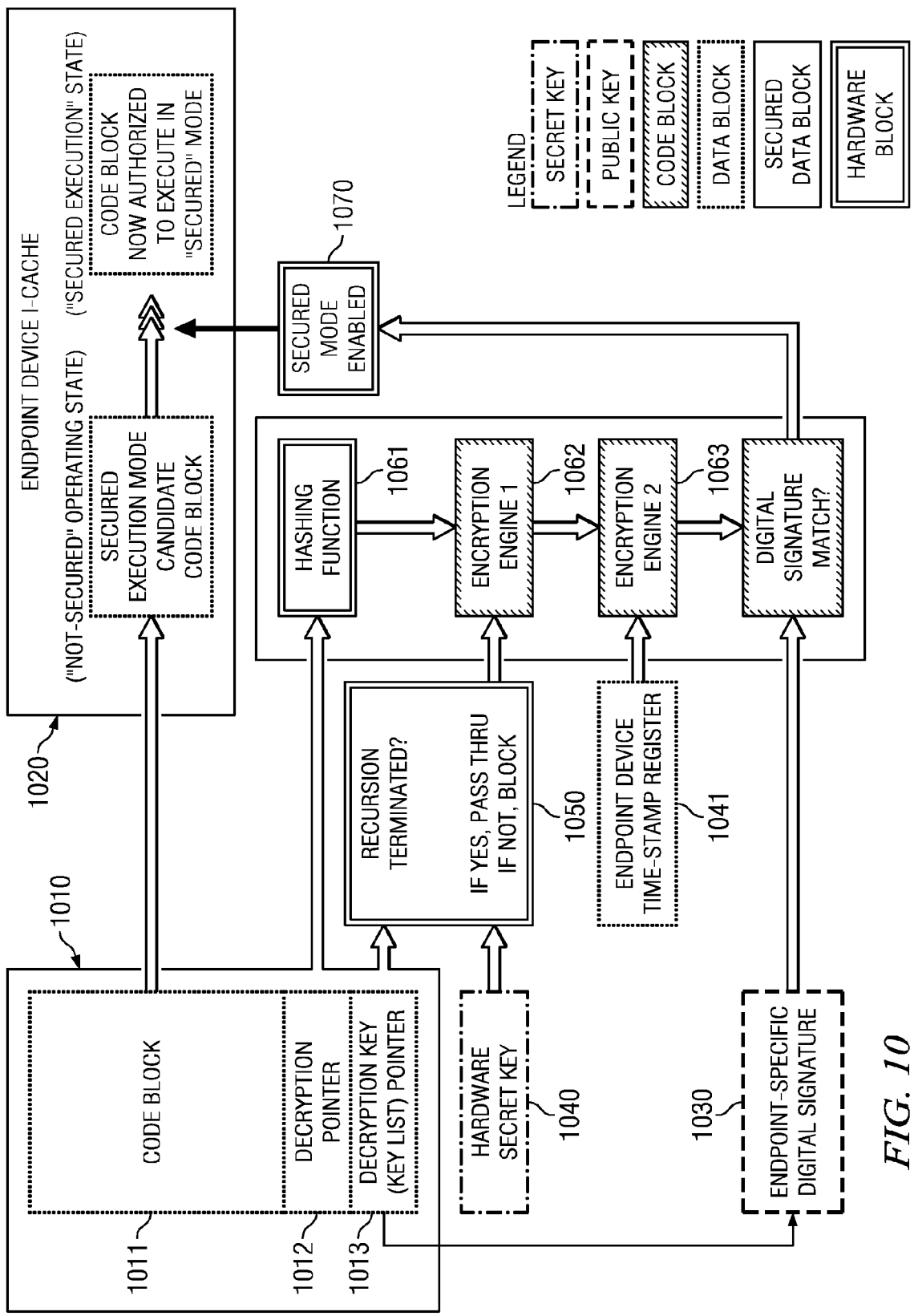
FIG. 10 depicts one embodiment of the use of a compound key in the authorization of a candidate code block.

FIG. 10 is a block diagram of one embodiment of how a code block may be allowed to run on a particular endpoint processor (under prescribed circumstances) in "secured execution" mode. In this particular case, the pre-computed digital signature 1030 (which can also be referred to as an endpoint-specific decryption key) of the code block 1011 is constructed using the message digest of the code block and encrypting it with one or more of the following: the secret key 1040 of an authorized target endpoint device, the most recent timestamp value 1041 of the authorized target endpoint device, or one or more of any number of constraining conditions as described earlier (not shown in this particular embodiment).

It should also be noted that any one of these terms could also be pre-conditioned by applying a masking function to a subset of the term itself. For example, if a number of the least significant bits of the timestamp field are masked off (and thus may not be considered in the calculation of the digital signature), then the effective granularity of that timestamp value can be easily controlled on a code-segment by code-segment basis without any changes in the hardware. This same principle can be applied to any number of the terms that are used in the calculation of the digital signature in certain embodiments.

As with the key list data structure depicted in FIG. 7, the concatenated digital data set 1010 that contains code block 1011 also includes at least one decryption pointer 1012 and at least one decryption key or key list pointer 1013. Also as described before, either one of these may refer to an external data structure (such as the Endpoint Specific Digital Key or Digital Signature 1030) or to an embedded data structure that is wholly contained within the concatenated data set 1010.

For purpose of describing the embodiment shown in FIG. 10, it will be assumed that code block 1011 is not encrypted (and is thus potentially executable on the endpoint device target processor). In this case, the decryption pointer may be null, since there is no further decryption required for the code block 1011 prior to its use. When the code block is not encrypted, as it is in this case, then its corresponding decryption key (pointer) 1013 may point to the associated endpoint or hardware-specific digital signature 1030. Thus, embodiments of data structures and methods such as those depicted earlier in FIGS. 4A, 4B, 5A and 5B may be used to enforce a wide variety of authentication, cryptographic binding or other constraints on the use of an unencrypted data set such as depicted in block 1011.

In the case where the endpoint specific digital signature (or decryption key) 1030 points only to the hardware secret key 1040 or alternately, only to the hardware secret key 1040 and the endpoint device timestamp register 1041, then we can determine that the security system related calls have reached the "bottom" of the calling chain and that there will be no further calls to additional layers of the security system in this particular calling chain. Thus, the security system recursion has "terminated" at this point. This recursion termination condition is detected by hardware block 1050, which acts as a "gatekeeper" to selectively allow or deny access to the value of the endpoint specific hardware secret key 1040, and then only as an input component to a cryptographic function that uses output of the hardware hashing function block 1061. In the example shown in FIG. 10, the hardware specific secret key 1040 and the (message digest) output of hardware hashing function block 1061 are used as input arguments to encryption engines 1062 and 1063.

Finally, if the output of encryption engine 1063 (which is a digital signature of the original concatenated data structure 1010) then matches the value of digital signature 1030 that was supplied, the "Secured Mode Enabled" hardware bit 1070 is then set. This condition indicates that the candidate code block 1011 that was loaded into the endpoint hardware I-Cache 1020 is now authorized to execute in "Secured" mode. Note that there is no physical change to the candidate code block 1011 that resides in I-cache 1020, nor is there any change to the I-cache 1020 itself. The only thing that has changed at this point is the value of the "Secured Mode Enabled" hardware bit 1070.

Figure 11:
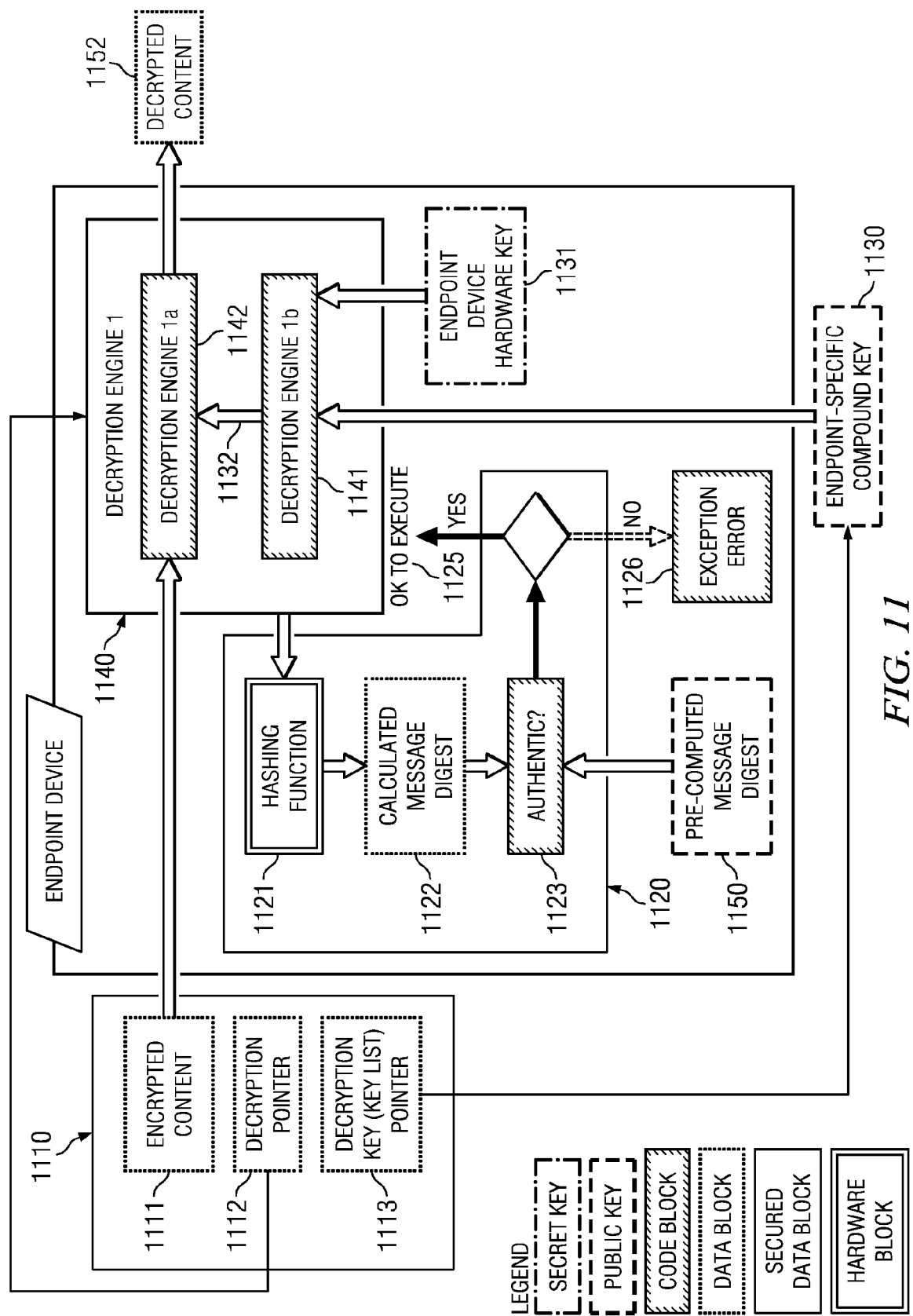
FIG. 11 depicts one embodiment of a decryption operation.

FIG. 11 depicts one embodiment of a decryption operation which may be performed by a recursive security system. This decryption operation may use a compound key to validate a secured code block that is to be used in the process of decrypting or otherwise manipulating and making use of distributed content. As described above, an endpoint device may receive a data structure 1110 containing encrypted content 1111, a pointer 1112 to a decryption engine 1120 (or the decryption engine itself) and a pointer 1113 to an Endpoint-Specific Compound key 1130 (as discussed earlier with respect to FIG. 9). Before it is allowed to execute in secured mode, the compound decryption engine 1140 pointed to, or received, will be authenticated. This authentication may be accomplished by calculating the message digest 1122 of the compound decryption engine 1140 code block using the hashing function 1121 resident in the endpoint device. Note that, although the hashing function 1121 is depicted as being a hardware block in this example, this hashing function 1121 may be, for example, a secured software code block that can be used in place of the endpoint device's built-in hardware hashing function, as was discussed earlier. In this case, however, the software version of the hashing function may still ultimately depend on the built-in hardware hashing function for authentication or authorization purposes, so the eventual root of trust in this case still resides with the endpoint's built-in hardware hashing function block 1121.

The message digest 1122 generated by this hashing block 1121 may then be compared in step 1123 against a pre-computed message digest 1150 that corresponds to the decryption engine 1140. This pre-computed message digest 1150 may for example, have been provided to the endpoint device in a secure fashion, or pre-computed and stored on the endpoint device itself. If the message digests match, then the compound decryption engine 1140 may be allowed to execute on the endpoint device (step 1125). If the message digests are not substantially identical, then an invalid code exception may occur (step 1126).

If however, the message digests are substantially identical, the processor of the endpoint device may then enter secured execution mode to execute the code contained in the compound decryption engine 1140. The first part of this compound decryption engine 1141 may be accomplished utilizing the endpoint device's hardware-specific secret key 1131 to generate the global content specific key from the compound key (step 1132). The second decryption operation 1142 may then use the intermediate result generated by decryption operation 1141 in order to generate the decrypted content 1152 from the encrypted content 1110, using the obtained global content specific key. It should be noted here that while decryption engine 1140 is depicted as a pair of decryption algorithms (1141 and 1142), it may encompass any fewer or greater number of cascaded decryption stages such that the final result of the operation of the various individual components (1141, 1142, etc.) of secured code block 1140 applied to the original encrypted data set 1110 will produce the desired decrypted content result 1152. It should also be noted that any two of these various individual decryption components may be either the same or different algorithms.

In certain embodiments, it may additionally be desired to layer further security thus, in some embodiments, a compound key may be formed from the pre-computed message digest using an endpoint device specific hardware key and an endpoint specific timestamp value, in substantially the same manner as was depicted earlier with respect to FIGS. 4A, 7C and 10.

Figure 12:
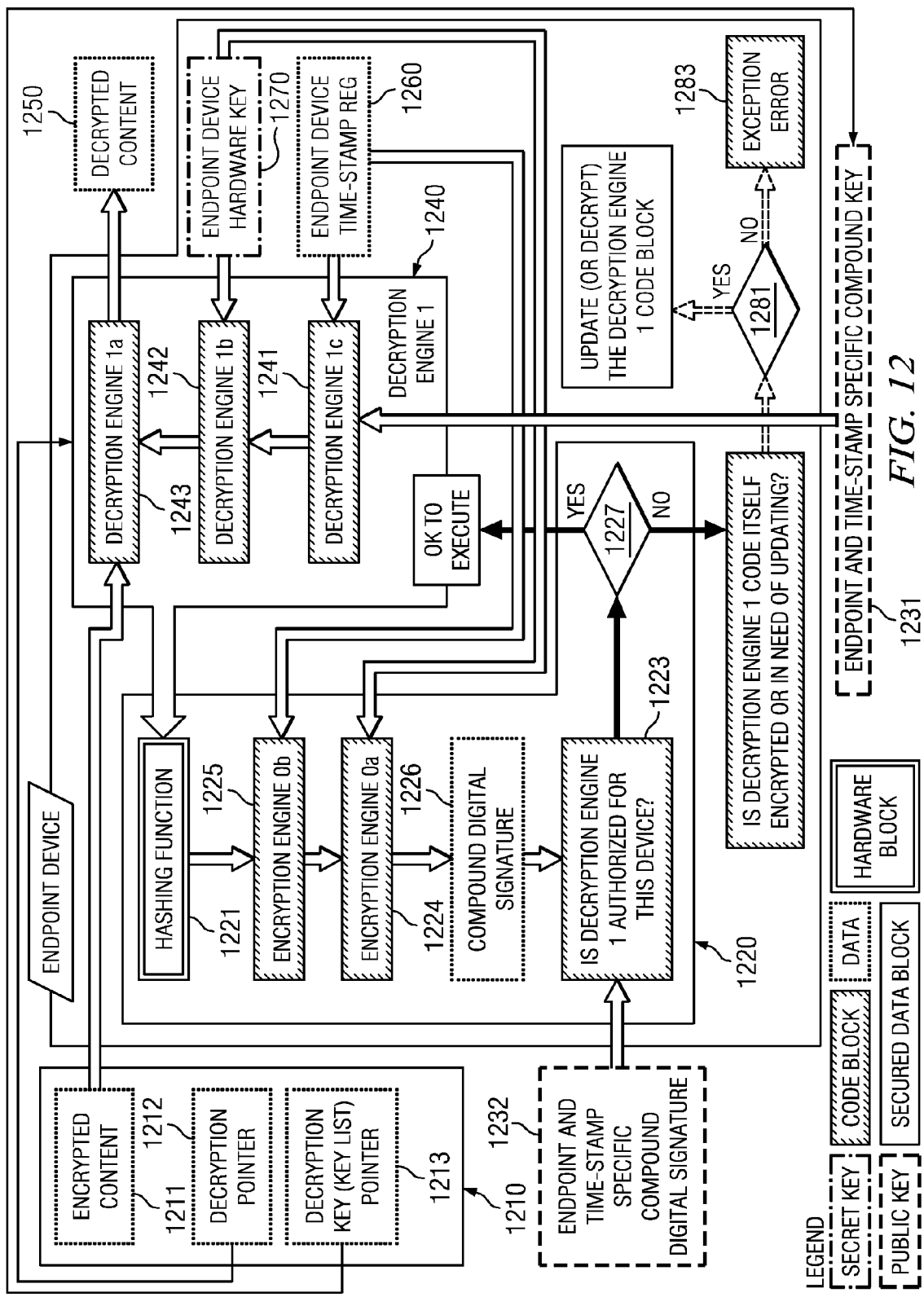
FIG. 12 depicts one embodiment of the validation of a code block.

FIG. 12 depicts one embodiment of the implementation of a recursive security protocol at an endpoint device. Specifically, one embodiment of the use of a set of compound keys for the validation of a secured code block as well as for the actual decryption/or other use of a distributed digital bitstream is depicted. This embodiment is similar to the embodiment depicted in FIG. 11 in many aspects so only those aspects of the embodiment that are different will be concentrated on with respect to FIG. 12. A message 1210 comprising encrypted content 1211 may be received including a pointer 1212 to a decryption engine 1240 (or the decryption engine itself), a content specific compound key 1231 (as discussed with respect to FIG. 8) and an endpoint and time stamp specific compound key 1232. The encrypted content 1211 can be loaded into memory at the endpoint device and the pointer 1212 to decryption engine 1240 may also be loaded into memory (for example, the instruction cache or secured portion of the instruction cache at the endpoint device). The decryption engine 1240 pointed to will then be authenticated. This authentication may be accomplished by computing the message digest of the encryption engine 1240 using the hashing function 1221 that is resident in the endpoint device, in a substantially similar manner as was described with respect to FIG. 11.

In this example, the hardware-generated message digest may then be encrypted using an encryption engine, which may be implemented either in hardware or in software on the endpoint device, and which comprises one or more cascaded compound encryption engine stages 1224, 1225, etc. that operate on the computed message digest and one or more of the hardware specific keys or registers, such as the endpoint device hardware specific secret key 1270 or the value of the endpoint device timestamp register 1260. The resulting compound digital signature 1226 that is generated may correctly correspond to the decryption engine code block 1240 and may also thus be cryptographically bound to the specific endpoint device (by using one or more encryption stages 1224, 1225 and the various secret or public variables or constants such as 1260 and 1270). As was discussed earlier, this generated digital signature may optionally be further encrypted (using either the same or different encryption engines) and other constraining variables or constants in order to further limit the applicability of this compound digital signature. Also, in the case where it is desired to extend the application of the code block 1240 that is associated with this digital signature 1232 beyond a single unique endpoint unit, for example, one or more of the encryption stages may be optionally limited in order to broaden the field of potential generated compound digital signature matches.

The generated compound digital signature 1226 may then be compared in step 1223 against the endpoint and time stamp specific compound digital signature 1232 corresponding to that encryption engine 1240 which may have been originally provided to the endpoint device (for example, by a licensing authority as a part of the endpoint code licensing process at a prior point). Note that the data structure may be identical whether this token 1232 is a digital signature or a key, so the terms "key" and "digital signature" may possibly be used interchangeably in those cases.

If the compound digital signatures 1226 and 1232 are substantially identical, the processor of the endpoint device may then be allowed to run the code contained in the decryption engine code block 1240 in secured execution mode. When running in secured execution mode, the decryption engine 1240 may then make use of the endpoint device's hardware key 1270 to generate the global content-specific key from the device-specific compound key 1231 using decryption engines 1241 or 1242. The global content-specific key may thus be an intermediate result and accordingly may never be cached or otherwise made visible to any software or hardware entities other than the compound decryption engine code block 1240. This global content-specific key is then used, by way of decryption engine 1243 to generate the final decrypted content 1250 from the original encrypted content 1211.

If, however, the generated digital signature 1226 does not substantially match the supplied digital signature 1232, then there may be several possible reasons why the mismatch may have occurred, including the case where attempts to make use of decryption engine code block 1240 are made by unauthorized parties. However, another possible reason for a mismatch may be the case where the software for decryption engine has been updated (and the endpoint's timestamp register has likewise been incremented or otherwise changed). In this case, the two digital signatures may not match and it may be checked in step 1281 if the encryption engine code 1240 is either itself encrypted (for example) or otherwise in need of replacement. Recall that embodiments discussed herein may be effectively utilized for a recursive security protocol, thus in many cases encryption algorithms (which may be pointed or included with encrypted content) may themselves be encrypted, these encrypted encryption algorithms themselves encrypted, etc. As such, if the generated endpoint and time stamp specific compound key 1226 for an encryption algorithm and the received endpoint and time stamp specific compound key 1232 do not match it may be the case that at least one more layer of indirection or encryption has been utilized.

As mentioned earlier, the concept of adding a layer of encryption to a particular executable code block can be logically equivalent with the act of replacing an outdated version of a particular code block with a newer version of that code block. Accordingly, it can be determined if the decryption engine 1240 is itself either encrypted or otherwise in need of replacement (as indicated in step 1282), as indicated by examining one or more of the following tokens associated with that code block: the endpoint and timestamp specific compound digital signature 1232, the code block's decryption pointer (not shown) or the code block's decryption key pointer (also not shown). In one example, if the code block's 1240 associated decryption pointer points to a null value, it would indicate that the encryption engine 1240 is not encrypted or otherwise outdated and thus, an exception error may result (step 1283), since the generated digital signature 1226 and the supplied digital signature 1232 are not substantially identical but there may be no other recourse for replacing the code block with a different version that may possibly produce the correct digital signature. If, however, the decryption engine code block's 1240 decryption pointer points to another code block; either another (possibly updated) encryption engine (not shown) or some other code block, then this new code block may be loaded and the authentication steps above applied to this next encryption engine (in other words, another layer of recursion may be introduced). This recursive execution mechanism may continue until it is determined that a match between an generated endpoint and time stamp specific compound digital signature 1226 and the supplied endpoint and time stamp specific compound digital signature 1232 occurs (at step 1227) or that it is determined that there is no match and the decryption engine 1240 itself is not encrypted, at which point an exception error may occur (step 1283).

If it is determined that a generated endpoint and time stamp specific compound digital signature 1226 and the supplied endpoint and time stamp specific compound digital signature 1232 match, then the recursion is terminated and may be unwound. This may entail the authentication and execution of each of the code blocks that were encountered and saved on the stack during the initial forward pass through the overall recursive calling chain. It should be noted that some or perhaps even all of these code blocks may not necessarily be encryption or decryption engines. In any case, each of these code blocks may be authenticated while the processor of the target endpoint device operates in secured execution mode.

This execution may be better explained with reference to FIG. 13, which depicts one embodiment of a decryption operation that may be performed by a recursive security system. As described, an endpoint device may receive a message 1310 that may contain, among other things, encrypted content 1312 along with a content specific compound key 1316 (as discussed with respect to FIG. 8), a pointer 1313 to an decryption engine data structure 1320 or the decryption engine itself, if it is embedded in the original message 1310 and a key list pointer 1314, that may point to a key or key list data structure 1318. As discussed earlier, this data structure may include a key or key list 1316 or a digital signature 1317. The decryption engine data structure 1320 may, in turn, contain an encrypted code block 1321, a subsequent decryption pointer 1322 associated with the encrypted (or alternately, obsolete and in need of replacement) decryption code block 1321 and an associated decryption key list pointer 1323. The subsequent decryption pointer 1322 may point to a final decryption code block data structure 1330, which has structure substantially similar to that of decryption code block data structure 1320, except that, in the case of data structure 1330, the decryption code block 1331 is not itself in encrypted form.

Figure 13:
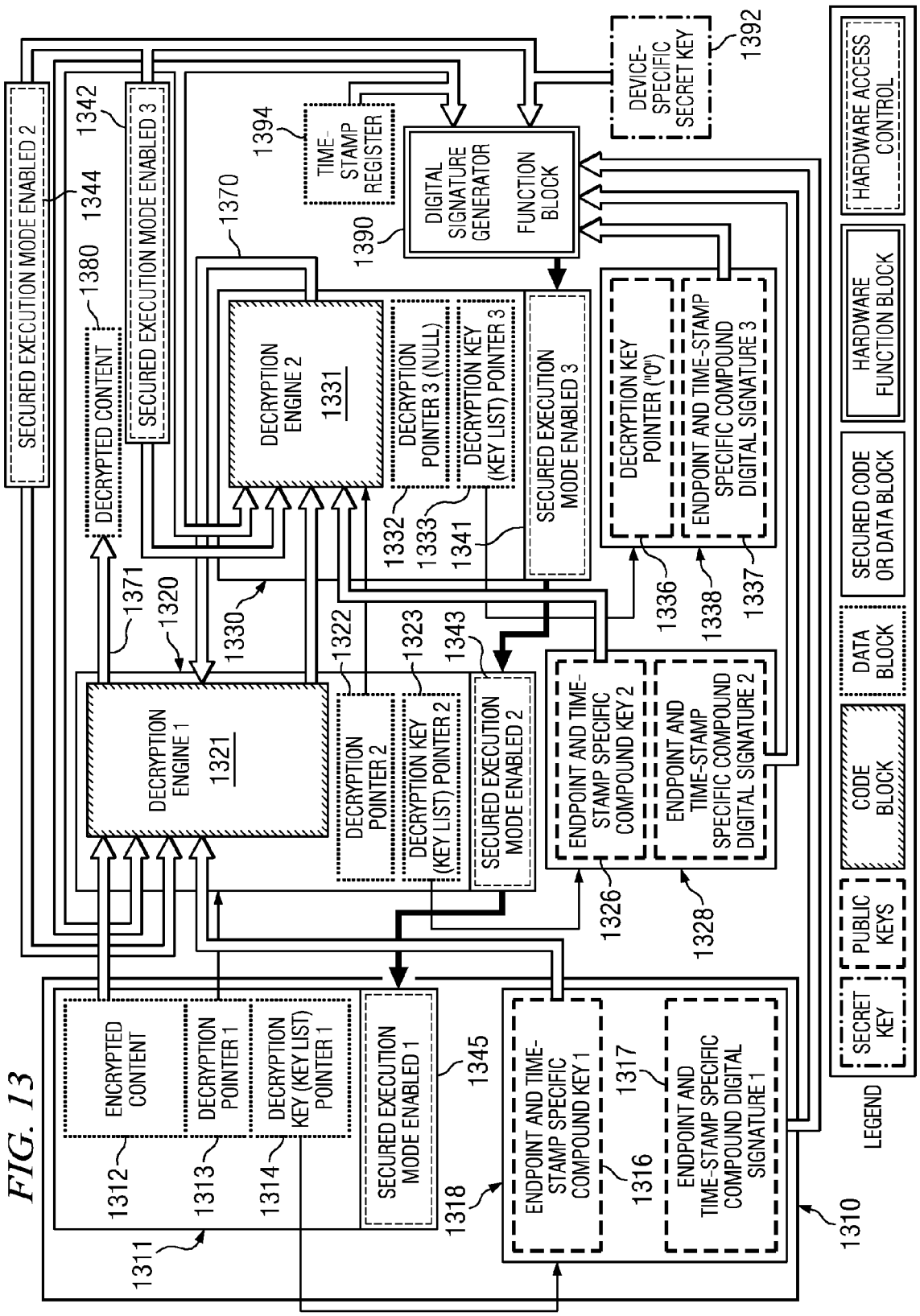
FIG. 13 depicts one embodiment of a decryption operation performed using a recursive security protocol.

The operation of the embodiment as depicted in FIG. 13 can be explained as follows. Encrypted Content data structure 1310 is loaded into the endpoint processor's memory space in anticipation of decrypting the encrypted content 1312 contained within. Since the data structure 1310 contains a decryption pointer 1313, the associated decryption engine code block data structure 1320 is located and read into memory. Since this subsequent data structure 1320 also contains a decryption pointer 1322 the decryption engine code block data structure 1330 associated with pointer 1322 is then located and loaded into memory. For data structure 1330, the embedded decryption pointer 1332 in this example is determined to be a null pointer, so the target endpoint device's security system is thus able to determine that the current decryption recursion chain has terminated (as discussed, for example, in FIG. 10) and thus, the decryption engine 1331 that was just read into memory as a part of data structure 1330 may contain an unencrypted (and thus potentially executable) code block.

Since it can be determined that digital content 1331 is a code block and not data (by the manner in which it was called), then it can also be determined that the key list data structure 1338 that is pointed to by the decryption key list pointer 1333 (which was read into memory as a part of data structure 1330) may contain a digital signature 1337 (in addition to a compound key 1336). It should also be noted that the key list data structures in this example (1318, 1328 and 1338) may be implemented using the universal cryptographic data structure as depicted earlier with respect to FIG. 7B. Thus, the order of the arguments in these key list data structures 1318, 1328 and 1338 is not necessarily fixed and they may therefore be interpreted at runtime as the data structures themselves are traversed. In fact, it should be noted that these key list data structures (1318, 1328 and 1338) may themselves include references to further decryption or subsequent interpretation by incorporating supplementary decryption pointers and key list pointers within any or all of these key list data structures (1318, 1328 and 1338) themselves, although this particular option was not pictured in the embodiment of FIG. 13 for the sake of simplicity.

It can further be determined that at least one of the key pointers 1336 in the key list data structure 1338 corresponds to a reference to the endpoint's hardware secret key 1392. This reference to the endpoint's hardware secret key 1392 may be accomplished either explicitly by pointing to an appropriately reserved memory location (a location that may be specified in the processor's architecture, even though it may never be directly read by the processor and thus, not directly architecturally visible) or implicitly, by using some specially reserved value for the pointer. In either case, this reference may implemented using various means, but an example one such embodiment may be to equate the value of "0" (as distinct from the value of "null") in the key list data structure to a reference to the endpoint's hardware secret key 1392. The fact that at least one part of the key list data structure refers to the endpoint's hardware secret key 1392 may further indicate that the decryption engine code block 1331 is intended to run in secured execution mode on the target endpoint device's processor. Thus, the output of hardware-based digital signature generator block 1390 is compared with the value stored in data structure 1337. In the case where the two values substantially match, then the processor is allowed to enter secured execution mode.

It should be noted here that hardware-based digital signature generator block 1390 (the details of one embodiment of which will be presented more comprehensively with respect to FIG. 15) may, in one embodiment, comprise one or more software-based elements, but may also incorporate at least one hardware-based security component, either directly or indirectly, as discussed earlier. That hardware component is the hardware-based hashing function that has been referenced in many of the earlier descriptions contained herein, and which comprises the overall target endpoint unit's security system root of trust.

At this point, then, decryption engine code block 1331 is allowed to run in secured execution mode, which allows the endpoint processor to potentially make use of the endpoint's hardware device-specific secret key 1392 as a part of a security-related computation (as has been described earlier herein). In the case where the processor was not operating in secured execution mode, then the value of secret key 1392 would not be available for use in such a security related computation. This concept is depicted with respect to FIG. 13 as hardware access control block 1343, which will only allow the value of secret key 1392 to pass through to subsequent use (for example in decryption engine code block 1331) if the processor is running in secured execution mode.

In addition, it can be seen that one of the input parameters to hardware access control block 1343 is the output of access control block 1341. In this manner, the state of hardware access control block 1343 (which is effectively the "secured execution mode enabled" indicator for decryption code block 1321) is dependent on the fact that decryption code block 1331 was also running in secured execution mode. This may be indicated by the state of the "secured execution mode enabled" indicator for decryption code block 1331 (for example, the output of hardware access control block 1341).

This dependency constrains the ability of decryption engine code block 1321 to be able to run in secured execution mode only if decryption code block 1331 was also running in secured execution mode. In an essentially identical manner, the output of hardware access control block 1343 is used as one of the inputs to hardware access control block 1345, which is the "secured execution mode enabled" indicator for decryption code block 1311. Thus the mechanism that allows the "secured execution mode enabled" bit to be propagated back up the calling chain in the reverse direction, for the purposes of authorizing the preceding parent code blocks to run in secured execution mode only if they are both authenticated properly (as will be explained in more detail with respect to FIG. 14) and if they are supplied with authentic decryption results from properly authorized portions of the security chain from lower down in the recursive calling chain. Note that, as described earlier, any one of several conditions may cause any of the "secured execution mode enabled" bits to be reset to a "non-secured" default state (and thus, potentially require the entire security chain to be restarted). Such conditions may include a processor interrupt or a subsequent digital signature comparison mismatch. Although these hardware access control blocks 1341, 1343 and 1345 are depicted as separate entities for purposes of clarity in FIG. 13, it can be seen that they may, in fact, be embodied in a single hardware unit (such as that described with respect to FIG. 15), whose output is thus fed back as one of its own input terms. Ultimately, the output of the highest-level or final "secured execution mode enabled" bit in the overall chain (in this embodiment, the output of hardware access control block 1345) may be used as part of a control mechanism to enable or disable some externally-visible output for the target device (such as an audio or video output enable, for example).

The action of decryption engine code block 1331 in step 1370 is to replace or otherwise supplement the data set stored in the decryption engine code block portion 1321 of data structure 1320 with an updated and/or properly executable version of the original data. This action may be accomplished utilizing the original data that was stored in 1321 and decrypting it with one or more decryption keys that are stored in or pointed to by key list data structure 1328. Alternately, as was discussed earlier, the action 1370 of decryption engine code block 1331 may be to either replace the decryption code block 1321 with an updated version or even to execute directly in place of decryption engine code block 1321. In any case, decryption engine code block 1331 may first operate using various input data, including (in this embodiment) the value contained in the target endpoint device's timestamp register 1394, the target endpoint device's hardware-specific secret key 1392 (as modified by passage through hardware access control 1342) and endpoint and timestamp-specific compound digital key 1326. In the case where decryption engine code block 1331 is then subsequently operating as a direct replacement of decryption engine code block 1321, it may then utilize a second set of input data (for example in this embodiment, the value contained in the target endpoint device's timestamp register 1394, the target endpoint device's hardware-specific secret key 1392 (as modified by passage through hardware access control 1344) and endpoint and timestamp-specific compound digital key 1316.

A further action of the updated decryption engine code block 1321 in step 1371 is to replace or otherwise interpret the original encrypted content data 1312 in order to produce the desired output data 1380. This action may be accomplished utilizing the original data that was stored in 1312 and decrypting it with one or more decryption keys that are stored in or pointed to by key list data structure 1318. Since the actions of both decryption engine code blocks 1321 and 1331 are similar in nature, is should be evident that any of the options detailed earlier in the description of the operation of decryption engine code block 1331 are equally applicable to the operation of the updated version of decryption engine code block 1321. Also, in the case of the operation of decryption engine code block 1321, it should be noted that in some embodiments, the associated hardware access control block 1344 is distinct from hardware access control block 1342. The actions of these two hardware access control blocks 1342 and 1344, however are similar in nature in that their purpose is to enable or disable the use of the target endpoint device's hardware-specific secret key 1392 by their associated decryption engines 1331 or 1321 respectively and thus in other embodiments may not be distinct.

Finally in all of the operations depicted in the embodiment of FIG. 13 described above, the use of the target endpoint device's timestamp register 1394 is essentially similar to those examples described earlier herein for other embodiments. Thus, it follows that the value stored in register 1394 may be used as an additional element in the generation of the various compound keys and/or digital signatures that are employed in the different authorization and decryption operations described in the particular embodiment depicted in FIG. 13.

Figure 14:
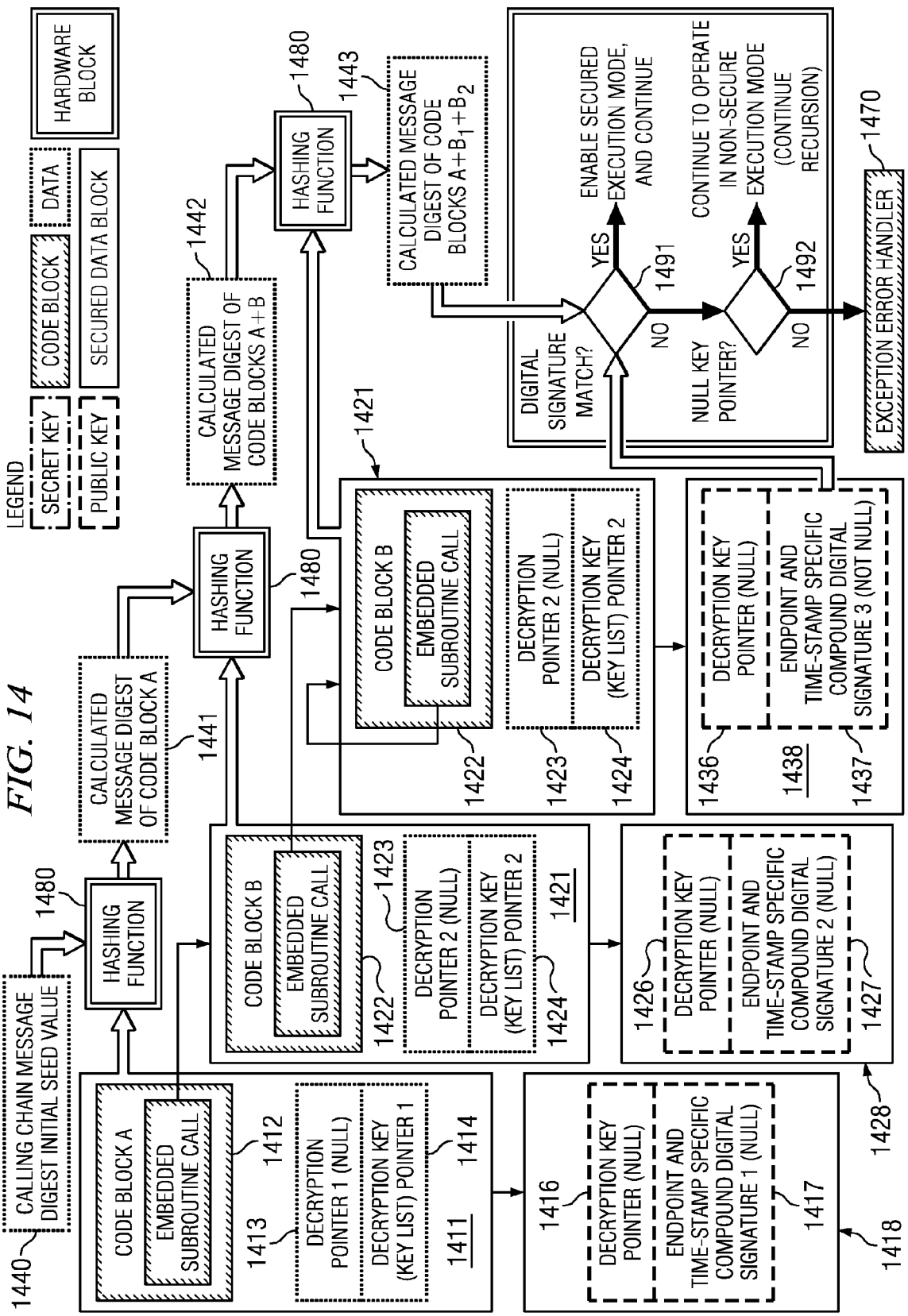
FIG. 14 depicts one embodiment of the operation of code validation.

FIG. 14 depicts one embodiment of how a recursive calling chain may be traversed and terminated and how a processor may be allowed to enter into secured execution mode using a message-digest based authentication of one or more embedded code blocks. In this embodiment, the operation of two candidate code blocks 1412 and 1422 may be explained, both of which may be contained within universal cryptographic data structures (1411 and 1421 respectively) as was discussed earlier with respect to FIG. 7B.

Notice that the code block data structure 1421 is represented twice in FIG. 14. This duplication was illustrated to represent separate iterations for the sake of clarity, although it should be noted that this is exactly the same data structure in both instances. One difference that may be noticed, however, is in the key list data structures 1428 and 1438 that are pointed to by the instances of key list pointer 1421. Even though the value of key list pointer 1421 does not vary between the two instances shown in this figure, the values contained within (or pointed to by) key list data structure 1428 may change between the two iterations, and so this detail is indicated by renumbering the data structure (and its various components) from 1426, 1427 and 1428 to 1436, 1437 and 1438 respectively. The fact that this structure is renumbered does not necessarily indicate that the actual location of the data structure has moved, just that its contents may have changed. Likewise, the hardware hashing function 1480 is also depicted multiple times in this figure, for the same reason of increased clarity. Finally, note that neither of the two candidate code blocks 1412 or 1422 are encrypted, and so their associated decryption pointers 1416, 1426 and 1436 may be all null pointers.

In this embodiment, a call to candidate code block 1412 may be initiated. In the same manner as has been described previously, the code block data structure 1411 may be read into memory and its message digest 1441 may be computed by means of hashing function 1480 (which may be realized either wholly or partially in hardware, as was described previously). However, in this embodiment, the hashing function may be given an initial seed value 1440 (which may, or may not, be set to all zeroes). As was discussed earlier, this hashing function seed value feature may be implemented using one of a number of methods, but in this embodiment the seed value

1440 is known and the method by which it affects the message digest output 1441 of hashing function block 1480 is both repeatable and deterministic.

Once the result 1441 of the hashing function is generated, the processor can begin executing the code contained in code block 1412. In the embodiment shown in FIG. 14, where both the decryption pointer 1413 and the values of both of the locations 1416 and 1417 (which are contained inside key list data structure 1418) that is pointed to by the key list pointer 1414 are all null, then code block 1412 may not be designed to run in secured execution mode and therefore does not require the use of any of the target endpoint unit's security hardware features. The processor thus begins to execute the instructions contained within code block 1412 until it reaches an embedded subroutine call that points to code block 1422.

At that point, code block data structure 1421 is loaded into memory and the process of generating the next message digest 1442 is repeated by the hashing function block 1480. In this particular instance, however, the hashing function seed value may no longer be the initial seed value 1440, but rather the previously generated result 1441. Thus, the value of message digest 1442 can be seen to be deterministically dependent on the message digest of both code blocks 1411 and 1421. However, as in the previous case, the values of decryption pointer 1423 those contained in the key list data structure 1428 pointed to by key list pointer 1424 may still be null, so the processor continues on in non-secured execution mode as before.

At some later point, the processor encounters another subroutine call, but in this example, code block 1422 contains a recursive call (for example, a subroutine call to itself). It should be noted that in certain embodiments, such a recursive calling structure is illustrative only and correct operation of the target endpoint device's security system may be achieved by other means, for example, be ensuring that any calls to the security system are contained within a single layer of code. However, as soon as multiple levels of the security system are to be traversed, then the recursive calling form may be relatively more secure, as detailed earlier, and may be effectively utilized to implement a security system in conjunction with the depicted embodiment.

In any case, when the processor encounters the subroutine call embedded inside code block 1422 (which references itself), then the code block data structure 1421 is once again loaded into memory (for example, in most contemporary systems, the data structure 1421 may be loaded to a different physical location the second time it is fetched) and the hashing function 1480 calculates the new message digest 1443. Notice that this new message digest 1443 is dependent on the initial message digest seed value 1440, message digest 1441 (of code block 1412) as well as the message digest of two separate iterations of code block 1422.

Also note that this second time, the key list pointer points to a new data structure 1438, that contains a non-null digital signature value 1437. This non-null value is an indicator to the security system that this iteration of code block 1422 contains a reference to the target endpoint hardware specific security system. Thus, in this embodiment, in order for such a reference to operate properly, the processor must enter secured execution mode at some point. Thus, the digital signature 1443 generated when code block data structure 1421 was most recently loaded into memory may then be compared to the digital signature 1437 contained within key list data structure 1438. In the case where the two values are found to be substantively similar in step 1491, then the target endpoint processor is allowed to enter secured execution mode. If, however, the two digital signature values 1437 and 1443 do not match (and given that digital signature 1437 is known to be non-null at this point), then the result of step 1492 is to direct the processor to execute the appropriate exception error handler portion 1470 of the security system.

FIG. 15 depicts one embodiment of how a digital signature generator block 1560 may be implemented in hardware in order to support the features detailed above. The embodiment depicted in FIG. 15 shows a hardware implementation of functionality similar to the functionality of the digital signature generator block depicted in FIG. 10 and which will support the functional features that were described in operational detail, for example, with respect to FIGS. 11, 12, 13 and 14.

The hashing function seed register 1510 may comprise a similar functionality as that labeled as block 1440 of FIG. 14 and it may be operable to hold the initial value that is fed to hashing function block 1561. The output of hashing function block 1561 is fed as one of the inputs to the first stage 1562 of a compound encryption engine. The other input to encryption engine 1562 is the output of the target endpoint device's timestamp register 1541. The resulting output of the first stage encryption engine 1562 is then supplied as one of the inputs to the second stage encryption engine 1563. The other input to second stage encryption engine 1563 is the output of secured execution mode access point 1566.

Access point 1566 is operable to pass through the value of the target endpoint's hardware specific secret key 1540 only when the target endpoint device is either running in secured execution mode or when the "recursion terminated" condition is detected, as was detailed earlier with respect to FIG. 14. The resulting output value from second stage encryption engine 1563 is then stored in digital signature register 1564, for use in comparing this generated digital signature with the digital signatures that are supplied with the candidate code blocks (as referenced, for example, in the descriptions of FIGS. 9, 10, 11, 12 13 and 14).

The output of digital signature register 1564 is gated by access point 1565, whose action is to pass through the value of digital signature register 1564 when the target endpoint device is not running in secured execution mode. The output of access point 1565 is then fed back to the input of the hashing function seed register 1510 in order to create the cascaded message digest feature that was detailed in the description with respect to FIG. 14. When the target endpoint device is running in secured execution mode, then the input to the hashing function seed register 1510 is not dependent on the value of digital signature register 1564 and can thus either be set to some initial value (as detailed in the description with respect to FIG. 14) or by some other means (for example, such as a processor write to a specific memory location).

In the foregoing specification, the invention has been described with reference to specific embodiments. However, one of ordinary skill in the art appreciates that various modifications and changes can be made without departing from the scope of the invention as set forth. Accordingly, the specification, appendices and figures are to be regarded in an illustrative rather than a restrictive sense, and all such modifications are intended to be included within the scope of invention, notwithstanding the use of any restrictive terms.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for controlling the execution of code on an endpoint device comprising:
   receiving a first bitstream at a device;
   obtaining a first key corresponding to the first bitstream, wherein the first key was created by hashing the first bitstream and encrypting the hashed first bitstream;
   authenticating the first bitstream using hardware at the device operable to access a first secret key specific to the device which is stored in the hardware of the device and is accessible when the device is executing in secured mode, wherein authenticating the first bitstream comprises:
      hashing the first bitstream,
      generating a second key by encrypting the hashed first bitstream, wherein the encryption of the hashed first bitstream is done in the hardware of the device and the hardware attempts to access the first secret key specific to the device and uses the result of the access in the encryption, and
      comparing the generated second key with the first key;
   if the second key and the first key match, executing the first bitstream on the processor in secured mode, wherein the first bitstream comprises a first encryption engine, and executing the first bitstream comprises decrypting encrypted digital content associated with the first bitstream using the first encryption engine and the first secret key specific to the device and the execution of the first bitstream is done in secured mode; and
   if the second key and the first key do not match, determining if the first bitstream is encrypted, and if the first bitstream is encrypted:
      obtaining a second bitstream;
      authenticating the second bitstream using the hardware at the device operable to access the first secret key specific to the device which is stored in the hardware, wherein authenticating the second bitstream comprises:
         obtaining a third key corresponding to the second bitstream, wherein the third key was created by hashing the second bitstream and encrypting the hashed second bitstream,
         hashing the second bitstream, wherein the hashing of the second bitstream utilizes the second key generated from the first bitstream as a seed value,
         generating a fourth key by encrypting the hashed second bitstream, wherein the encryption of the hashed second bitstream is done in the hardware of the device and the hardware attempts to access the first secret key specific to the device and uses the result of this access in the encryption,
      comparing the generated fourth key with the third key, and
      if the fourth key and the third key match, executing the second bitstream on the processor in secured mode.

2. The method of claim 1, wherein the authentication of the second bitstream and execution of the second bitstream is done before the execution of the first bitstream.

3. The method of claim 2, further comprising authenticating the first bitstream after the execution of the second bitstream and before the execution of the first bitstream.

4. A method for controlling the execution of code on an endpoint device comprising:
   receiving a first bitstream at a device;
   obtaining a first key corresponding to the first bitstream wherein the first key was created by hashing the first bitstream and encrypting the hashed first bitstream;
   authenticating the first bitstream using hardware at the device operable to access a first secret key specific to the device which is stored in the hardware of the device and is accessible when the device is executing in secured mode, wherein authenticating the first bitstream comprises:
      hashing the first bitstream,
      generating a second key by encrypting the hashed first bitstream, wherein the encryption of the hashed first bitstream is done in the hardware of the device and the hardware attempts to access the first secret key specific to the device and uses the result of the access in the encryption, and
      comparing the generated second key with the first key;
   if the second key and the first key match, executing the first bitstream on the processor in secured mode, wherein the first bitstream comprises a first encryption engine, and executing the first bitstream comprises decrypting encrypted digital content associated with the first bitstream using the first encryption engine and the first secret key specific to the device and the execution of the first bitstream is done in secured mode; and
   if the second key and the first key do not match, determining if the first bitstream is encrypted, and if the first bitstream is encrypted:
      obtaining a second bitstream, wherein the second bitstream comprises a second encryption engine;
      authenticating the second bitstream using the hardware at the device operable to access the first secret key specific to the device which is stored in the hardware, wherein authenticating the second bitstream comprises:
         obtaining a third key corresponding to the second bitstream, wherein the third key was created by hashing the second bitstream and encrypting the hashed second bitstream,
         hashing the second bitstream,
         generating a fourth key by encrypting the hashed second bitstream, wherein the encryption of the hashed second bitstream is done in the hardware of the device and the hardware attempts to access the first secret key specific to the device and uses the result of this access in the encryption,
      comparing the generated fourth key with the third key, and
      if the fourth key and the third key match, executing the second bitstream on the processor in secured mode wherein executing the second bitstream comprises decrypting both the first bitstream and the encrypted digital content with the second encryption engine using the first secret key specific to the device.

5. The method of claim 4, wherein the authentication of the second bitstream and execution of the second bitstream is done before the execution of the first bitstream.

6. The method of claim 5, further comprising authenticating the first bitstream after the execution of the second bitstream and before the execution of the first bitstream.

7. The method of claim 6, wherein the first bitstream, second bitstream, encrypted digital content, first key and third key were received in a message, the message generated by:
   encrypting the digital content with the first encryption engine of the first bitstream;
   generating the first key by hashing the first bitstream and encrypting the hashed first bitstream with the first secret key specific to the device;
   associating the first key, first bitstream and encrypted digital content;

encrypting the associated the first key, first bitstream and encrypted digital content with the second encryption engine of the second bitstream;

generating the third key by hashing the second bitstream and encrypting the hashed second bitstream with the first secret key specific to the device;

associating the first decryption algorithm with the first encrypted bitstream; and associating the third key, second bitstream and encrypted associated first key, first bitstream and encrypted digital content.

8. A system for controlling the execution of code, comprising:

a device, comprising:

a processor;

first hardware for storing a first secret key;

second hardware operable to: access the first secret key when the processor is executing in secured mode, and implement an encryption algorithm using the first secret key a computer readable storage media comprising instructions executable by the processor for:

receiving a first bitstream at the device wherein the first bitstream comprises a first encryption engine;

obtaining a first key corresponding to the first bitstream, wherein the first key was created by hashing the first bitstream and encrypting the hashed first bitstream;

authenticating the first bitstream using the second hardware at the device wherein authenticating the first bitstream comprises:

hashing the first bitstream, generating a second key by encrypting the hashed first bitstream, wherein the encryption of the hashed first bitstream is done in the second hardware of the device and the second hardware attempts to access the first secret key specific to the device and uses the result of the access in the encryption, and comparing the generated second key with the first key;

if the second key and the first key match, executing the first bitstream on the processor in secured mode wherein executing the first bitstream comprises decrypting encrypted digital content associated with the first bitstream using the first encryption engine and the first secret key specific to the device and the execution of the first bitstream is done in secured mode;

determining if the first bitstream is encrypted and if the first bitstream is encrypted:

obtaining a second bitstream;

authenticating the second bitstream using the second hardware at the device operable to access the first secret key specific to the device which is stored in the first hardware, wherein authenticating the second bitstream comprises:

obtaining a third key corresponding to the second bitstream, wherein the third key was created by hashing the second bitstream and encrypting the hashed second bitstream, hashing the second bitstream, wherein the hashing of the second bitstream utilizes the second key generated from the first bitstream as a seed value, generating a fourth key by encrypting the hashed second bitstream, wherein the encryption of the hashed second bitstream is done in the second hardware of the device and the second hardware attempts to access the first secret key specific to the device and uses the result of this access in the encryption, comparing the generated fourth key with the third key; and if the fourth key and the third key match, executing the second bitstream on the processor in secured mode.

9. The system of claim 8, wherein the authentication of the second bitstream and execution of the second bitstream is done before the execution of the first bitstream.

10. The system of claim 9, wherein the instructions are operable for authenticating the first bitstream after the execution of the second bitstream and before the execution of the first bitstream.

11. A system for controlling the execution of code, comprising:

a device, comprising:

a processor;

first hardware for storing a first secret key;

second hardware operable to: access the first secret key when the processor is executing in secured mode, and implement an encryption algorithm using the first secret key a computer readable storage media comprising instructions executable by the processor for:

receiving a first bitstream at the device, wherein the first bitstream comprises a first encryption engine;

obtaining a first key corresponding to the first bitstream, wherein the first key was created by hashing the first bitstream and encrypting the hashed first bitstream;

authenticating the first bitstream using the second hardware at the device wherein authenticating the first bitstream comprises:

hashing the first bitstream, generating a second key by encrypting the hashed first bitstream, wherein the encryption of the hashed first bitstream is done in the second hardware of the device and the second hardware attempts to access the first secret key specific to the device and uses the result of the access in the encryption, and comparing the generated second key with the first key;

if the second key and the first key match, executing the first bitstream on the processor in secured mode wherein executing the first bitstream comprises decrypting encrypted digital content associated with the first bitstream using the first encryption engine and the first secret key specific to the device and the execution of the first bitstream is done in secured mode;

determining if the first bitstream is encrypted and if the first bitstream is encrypted:

obtaining a second bitstream, wherein the second bitstream comprises a second encryption engine, authenticating the second bitstream using the second hardware at the device operable to access the first secret key specific to the device which is stored in the first hardware, wherein authenticating the second bitstream comprises:

obtaining a third key corresponding to the second bitstream, wherein the third key was created by hashing the second bitstream and encrypting the hashed second bitstream, hashing the second bitstream, generating a fourth key by encrypting the hashed second bitstream, wherein the encryption of the hashed second bitstream is done in the second hardware of the device and the second hardware attempts to access the first secret key specific to the device and uses the result of this access in the encryption, comparing the generated fourth key with the third key; and if the fourth key and the third key match, executing the second bitstream on the processor in secured mode wherein executing the second bitstream comprises decrypting both the first bitstream and the encrypted digital content with the second encryption engine using the first secret key specific to the device.

12. The system of claim 11, wherein the authentication of the second bitstream and execution of the second bitstream is done before the execution of the first bitstream.

13. The system of claim 12, wherein the instructions are operable for authenticating the first bitstream after the execution of the second bitstream and before the execution of the first bitstream.

14. The system of claim 13, wherein the first bitstream, second bitstream, encrypted digital content, first key and third key were received in a message, the message generated by:
    encrypting the digital content with the first encryption engine of the first bitstream;
    generating the first key by hashing the first bitstream and encrypting the hashed first bitstream with the first secret key specific to the device;
    associating the first key, first bitstream and encrypted digital content;
    encrypting the associated the first key, first bitstream and encrypted digital content with the second encryption engine of the second bitstream;
    generating the third key by hashing the second bitstream and encrypting the hashed second bitstream with the first secret key specific to the device;
    associating the first decryption algorithm with the first encrypted bitstream; and
    associating the third key, second bitstream and encrypted associated first key, first bitstream and encrypted digital content.

15. A non-transitory computer readable media, comprising instructions executable by a processor for controlling the execution of code on an endpoint device, including instructions executable for:
    receiving a first bitstream at a device;
    obtaining a first key corresponding to the first bitstream, wherein the first key was created by hashing the first bitstream and encrypting the hashed first bitstream;
    authenticating the first bitstream using hardware at the device operable to access a first secret key specific to the device which is stored in the hardware of the device and is accessible when the device is executing in secured mode, wherein authenticating the first bitstream comprises:
        hashing the first bitstream,
        generating a second key by encrypting the hashed first bitstream, wherein the encryption of the hashed first bitstream is done in the hardware of the device and the hardware attempts to access the first secret key specific to the device and uses the result of the access in the encryption, and
        comparing the generated second key with the first key;
    if the second key and the first key match, executing the first bitstream on the processor in secured mode, wherein the first bitstream comprises a first encryption engine, and executing the first bitstream comprises decrypting encrypted digital content associated with the first bitstream using the first encryption engine and the first secret key specific to the device and the execution of the first bitstream is done in secured mode; and
    if the second key and the first key do not match, determining if the first bitstream is encrypted, and if the first bitstream is encrypted:
        obtaining a second bitstream;
        authenticating the second bitstream using the hardware at the device operable to access the first secret key specific to the device which is stored in the hardware wherein authenticating the second bitstream comprises:
            obtaining a third key corresponding to the second bitstream, wherein the third key was created by hashing the second bitstream and encrypting the hashed second bitstream,
            hashing the second bitstream, wherein the hashing of the second bitstream utilizes the second key generated from the first bitstream as a seed value,
            generating a fourth key by encrypting the hashed second bitstream, wherein the encryption of the hashed second bitstream is done in the hardware of the device and the hardware attempts to access the first secret key specific to the device and uses the result of this access in the encryption,
            comparing the generated fourth key with the third key, and
        if the fourth key and the third key match, executing the second bitstream on the processor in secured mode.

16. The non-transitory computer readable media of claim 15, wherein the authentication of the second bitstream and execution of the second bitstream is done before the execution of the first bitstream.

17. The non-transitory computer readable media of claim 16, further comprising authenticating the first bitstream after the execution of the second bitstream and before the execution of the first bitstream.

18. A non-transitory computer readable media, comprising instructions executable by a processor for controlling the execution of code on an endpoint device, including instructions executable for:
    receiving a first bitstream at a device;
    obtaining a first key corresponding to the first bitstream, wherein the first key was created by hashing the first bitstream and encrypting the hashed first bitstream;
    authenticating the first bitstream using hardware at the device operable to access a first secret key specific to the device which is stored in the hardware of the device and is accessible when the device is executing in secured mode, wherein authenticating the first bitstream comprises:
        hashing the first bitstream,
        generating a second key by encrypting the hashed first bitstream, wherein the encryption of the hashed first bitstream is done in the hardware of the device and the hardware attempts to access the first secret key specific to the device and uses the result of the access in the encryption, and
        comparing the generated second key with the first key;
    if the second key and the first key match, executing the first bitstream on the processor in secured mode, wherein the first bitstream comprises a first encryption engine, and executing the first bitstream comprises decrypting encrypted digital content associated with the first bitstream using the first encryption engine and the first secret key specific to the device and the execution of the first bitstream is done in secured mode; and
    if the second key and the first key do not match, determining if the first bitstream is encrypted, and if the first bitstream is encrypted:

obtaining a second bitstream, wherein the second bitstream comprises a second encryption engine;

authenticating the second bitstream using the hardware at the device operable to access the first secret key specific to the device which is stored in the hardware, wherein authenticating the second bitstream comprises:

obtaining a third key corresponding to the second bitstream, wherein the third key was created by hashing the second bitstream and encrypting the hashed second bitstream, hashing the second bitstream, generating a fourth key by encrypting the hashed second bitstream, wherein the encryption of the hashed second bitstream is done in the hardware of the device and the hardware attempts to access the first secret key specific to the device and uses the result of this access in the encryption, comparing the generated fourth key with the third key, and if the fourth key and the third key match, executing the second bitstream on the processor in secured mode wherein executing the second bitstream comprises decrypting both the first bitstream and the encrypted digital content with the second encryption engine using the first secret key specific to the device.

19. The non-transitory computer readable media of claim 18, wherein the authentication of the second bitstream and execution of the second bitstream is done before the execution of the first bitstream.

20. The non-transitory computer readable media of claim 19, further comprising authenticating the first bitstream after the execution of the second bitstream and before the execution of the first bitstream.

21. The non-transitory computer readable media of claim 20, wherein the first bitstream, second bitstream, encrypted digital content, first key and third key were received in a message, the message generated by:

encrypting the digital content with the first encryption engine of the first bitstream;

generating the first key by hashing the first bitstream and encrypting the hashed first bitstream with the first secret key specific to the device;

associating the first key, first bitstream and encrypted digital content;

encrypting the associated the first key, first bitstream and encrypted digital content with the second encryption engine of the second bitstream;

generating the third key by hashing the second bitstream and encrypting the hashed second bitstream with the first secret key specific to the device;

associating the first decryption algorithm with the first encrypted bitstream; and associating the third key, second bitstream and encrypted associated first key, first bitstream and encrypted digital content.

* * * * *